(12) United States Patent
Eromaki et al.

(10) Patent No.: US 8,041,201 B2
(45) Date of Patent: Oct. 18, 2011

(54) CAMERA MODULE HAVING MOVABLE LENS

(75) Inventors: Marko Eromaki, Tampere (FI); Mikko Ollila, Tempere (FI)

(73) Assignee: Nokia Corporation, Espoo (FI)

( * ) Notice: Subject to any disclaimer, the term of this patent is extended or adjusted under 35 U.S.C. 154(b) by 469 days.

(21) Appl. No.: 12/080,695

(22) Filed: Apr. 3, 2008

(65) Prior Publication Data

US 2009/0252488 A1 Oct. 8, 2009

(51) Int. Cl.
 *G03B 17/00* (2006.01)
 *G02B 27/64* (2006.01)
(52) U.S. Cl. ......................... 396/55; 359/554
(58) Field of Classification Search .................... 396/55, 396/133, 529, 535, 542; 348/208.99, 208.4, 348/208.7, 208.11, 373; 310/12, 309, 12.16, 310/12.31; 359/554, 557
See application file for complete search history.

(56) References Cited

U.S. PATENT DOCUMENTS

| | | | |
|---|---|---|---|
| 5,084,724 A * | 1/1992 | Maeno ............................. | 396/55 |
| 5,589,239 A | 12/1996 | Tomono et al. ................. | 428/34 |
| 5,835,799 A | 11/1998 | Washisu .......................... | 396/55 |
| 6,940,542 B2 * | 9/2005 | Kitazawa et al. ........ | 348/208.99 |
| 2001/0022688 A1 | 9/2001 | Kosaka et al. ................. | 359/557 |
| 2004/0013420 A1 | 1/2004 | Hara ............................... | 396/55 |
| 2004/0207745 A1 | 10/2004 | Tsuruta et al. ................ | 348/335 |
| 2006/0033818 A1 * | 2/2006 | Wada et al. .............. | 348/208.11 |
| 2006/0228099 A1 * | 10/2006 | Chiang .......................... | 396/133 |
| 2006/0272328 A1 | 12/2006 | Hara et al. ..................... | 60/527 |
| 2007/0047934 A1 * | 3/2007 | Otaka ............................. | 396/55 |
| 2007/0103555 A1 | 5/2007 | Eromaki ..................... | 348/208.4 |
| 2007/0177279 A1 | 8/2007 | Cho et al. ...................... | 359/692 |
| 2007/0247539 A1 | 10/2007 | Ho et al. ........................ | 348/335 |
| 2008/0187301 A1 * | 8/2008 | Takahashi ....................... | 396/55 |

FOREIGN PATENT DOCUMENTS

| | | |
|---|---|---|
| EP | 0 253 375 B1 | 2/1993 |
| EP | 0 572 976 | 12/1993 |
| JP | 7248522 A | 9/1995 |
| KR | 20080010861 A | 1/2008 |

OTHER PUBLICATIONS

Product line for Panasonic LUMIX digital still cameras from Lumix website, 2 pgs.

* cited by examiner

*Primary Examiner* — W. B. Perkey
*Assistant Examiner* — Minh Phan
(74) *Attorney, Agent, or Firm* — Harrington & Smith

(57) ABSTRACT

Disclosed herein is an apparatus. The apparatus includes a housing, a first magnet member, a lens holder, and a second magnet member. The first magnet member is connected to the housing. The first magnet member includes a first surface. The lens holder is in the housing. The lens holder includes a lens. The second magnet member is connected to the lens holder. The second magnet member includes a second surface. The second surface is opposite the first surface of the first magnet member. The second magnet member is configured to move in a direction substantially normal to the first surface of the first magnet member when a magnetic force is generated between the first magnet member and the second magnet member.

9 Claims, 24 Drawing Sheets

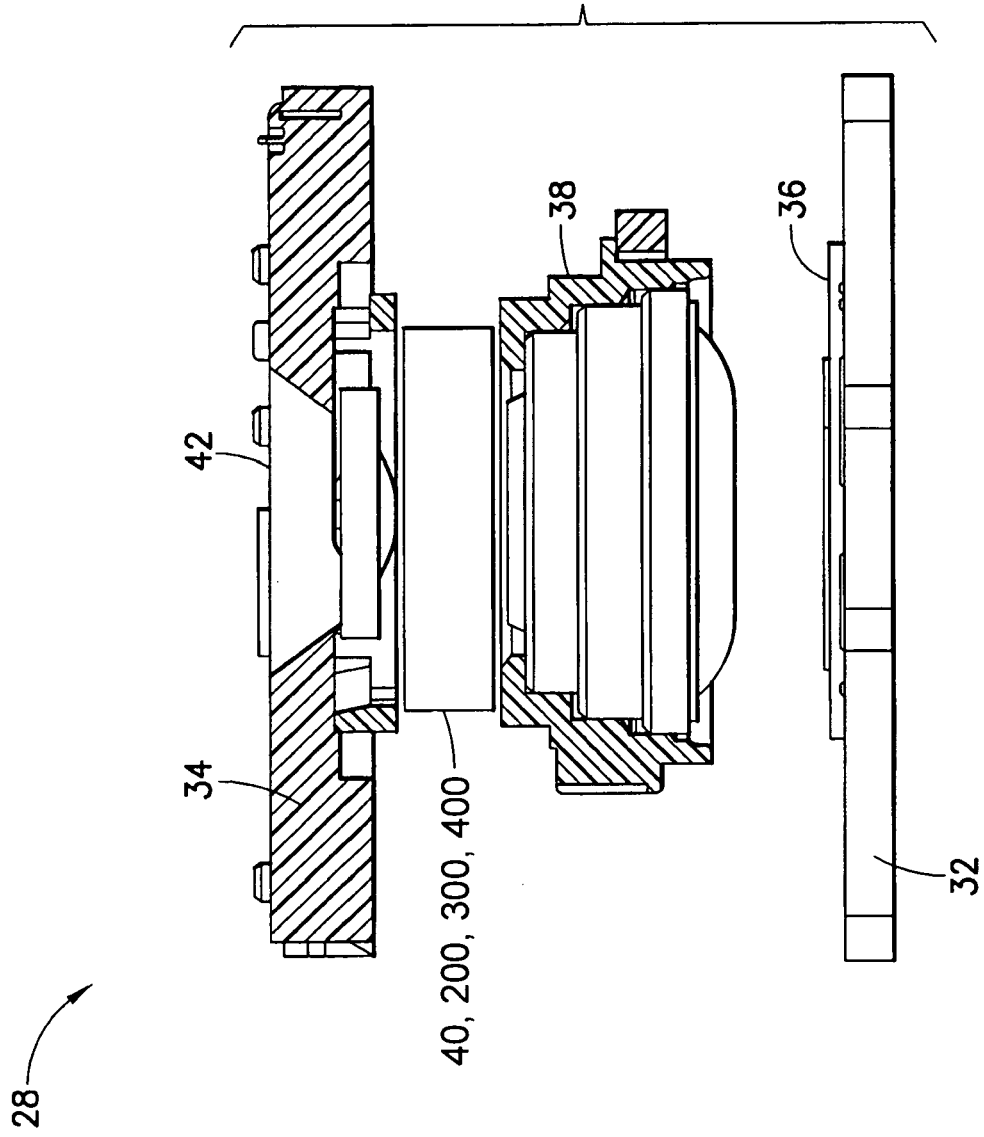

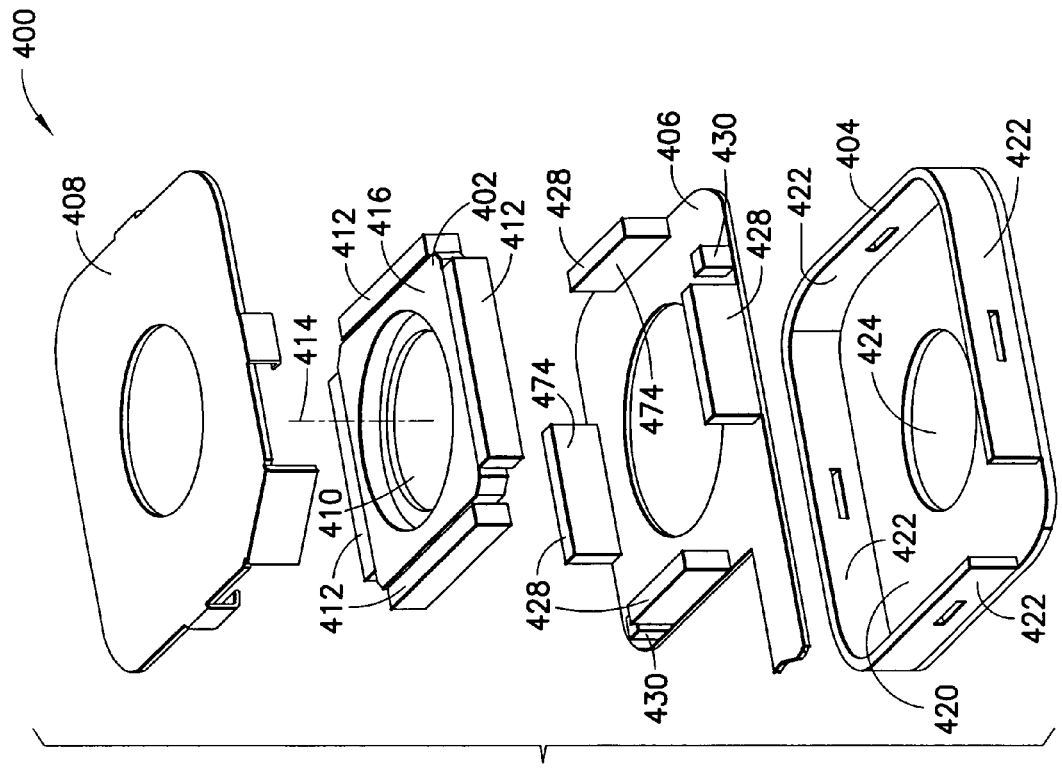

CAMERA MODULE HAVING MOVABLE LENS

BACKGROUND OF THE INVENTION

1. Field of the Invention

The invention relates to a camera module and, more particularly, to a camera module having a movable lens.

2. Brief Description of Prior Developments

As electronic devices continue to become more sophisticated, these devices provide an increasing amount of functionality by providing several applications within the device. One common application included with electronic devices is a digital camera application.

Electronic devices having digital camera applications with a movable lens are known in the art. For example, U.S. Patent Application Publication No. 2007/0247539 discloses a multi-stage lens driving device for use in various electronic devices. The lens driving device moves an optical lens to provide autofocus/zoom capabilities.

FIG. 29 illustrates an example of a conventional autofocus configuration 28A. The autofocus configuration 28A comprises a large sized sensor 36A with a large shutter 38A on top of (or over) the sensor 36A. All of the lenses 39A move during the autofocus operations in this conventional example.

FIG. 30 illustrates another conventional autofocus configuration 300A. The autofocus configuration 300A comprises a complex voice coil motor (VCM) structure which is located around a lens barrel. The autofocus configuration 300A footprint size may be about 9.5 mm×about 9.5 mm. FIG. 31 further illustrates the complex VCM structure of the configuration 300A in an exploded view. The conventional VCM structure may comprise a printed wiring board 301A having a sensor 303A and a driver IC 305A, a sensor holder 307A, an IR glass 309A, a barrel assembly 311A, a base 313A, a first spring 315A, a carrier 317A, a coil 319A, a spacer 321A, magnets 323A, a yoke 325A, a second spring 327A, a frame 329A, and a top cover 331A.

The demand for continuous size miniaturization generates challenges to implement added camera functionality such as autofocus and zoom operations. As such, there is a problem of implementing conventional lens driving devices for movable lenses in small electronic device configurations.

Additionally, conventional electronic devices offer limited functionality due to the demand for miniaturized devices. For example, image stabilization functions have not been widely implemented in electronic devices, such as mobile phones. However, existing mid-range digital still cameras (such as camera models from Panasonic Corporation or Sony Corporation model DSC T9, for example) provide image stabilization functionality. In conventional digital still cameras, a balancing effect can be implemented by moving the optics (lens) or the sensor. Further information regarding Panasonic's optical image stabilization system may be found at http://panasonic.co.jp/pavc/global/lumix/.

FIG. 32 illustrates another conventional image stabilization configuration 400A. In this example, the lens 401A is moved with electromagnetic actuators along x-y guides 403A, 405A. The image stabilization size may be about 20 mm×about 20 mm×about 9 mm.

U.S. patent application Ser. No. 11/267,394, filed on Nov. 4, 2005, which is hereby incorporated by reference in its entirety, illustrates another image stabilization configuration. In this example, the actuator system comprises piezos.

However, conventional configurations do not provide practical size wise configurations for implementation into small electronic devices. Additionally, as consumers demand increased functionality from small electronic devices, there is a need to provide robust and compact configurations having autofocus and/or image stabilization functionality.

Accordingly, there is a desire to provide an improved camera with a movable lens for use in an electronic device.

SUMMARY OF THE INVENTION

In accordance with one aspect of the invention, an apparatus is disclosed. The apparatus includes a housing, a first magnet member, a lens holder, and a second magnet member. The first magnet member is connected to the housing. The first magnet member includes a first surface. The lens holder is in the housing. The lens holder includes a lens. The second magnet member is connected to the lens holder. The second magnet member includes a second surface. The second surface is opposite the first surface of the first magnet member. The second magnet member is configured to move in a direction substantially normal to the first surface of the first magnet member when a magnetic force is generated between the first magnet member and the second magnet member.

In accordance with another aspect of the invention, an apparatus is disclosed. The apparatus includes a housing, a lens holder, a first magnet member, and a second magnet member. The housing includes a first end and an opposite second end. The lens holder is in the housing. The lens holder includes a first side, an opposite second side, and a lens. The lens includes a central axis. The first side and the second side are substantially perpendicular to the central axis. The first side of the lens holder is proximate the first end of the housing. The second side of the lens holder is proximate the second end of the housing. The lens holder is configured to be movable between the first end and the second end of the housing along the central axis. The first magnet member is connected to the first end of the housing. The second magnet member is connected to the lens holder. The second magnet member is proximate the first side of the lens holder. The second magnet member is opposite the first magnet member. The second magnet member is configured to be spaced from the first magnet member in a direction along the central axis.

In accordance with another aspect of the invention, an apparatus is disclosed. The apparatus includes a housing section, electronic circuitry, and a camera module. The electronic circuitry is mounted in the housing section. The camera module is connected to the electronic circuitry. The camera module includes a lens holder, a first magnet member, a second magnet member, and a third magnet member. The first magnet member is proximate a first end of the camera module. The second magnet member is connected to the lens holder. The third magnet member is proximate a second end of the camera module. The first magnet member, the second magnet member, and the third magnet member are configured to exert a force on the lens holder. The lens holder is configured to be movable between the first end and the second end of the camera module along a first direction and a second direction. The second direction is substantially perpendicular to the first direction.

In accordance with another aspect of the invention, a method is disclosed. A housing is provided. A first magnet member is connected to the housing. The first magnet member includes a first surface. A lens holder is installed in the housing. The lens holder includes a lens. A second magnet member is connected to the lens holder. The second magnet member includes a second surface. The second surface is opposite the first surface of the first magnet member. The second magnet member is configured to move in a direction substantially normal to the first surface of the first magnet member when a magnetic force is generated between the first magnet member and the second magnet member.

In accordance with another aspect of the invention, a method is disclosed. A housing including a first end and an opposite second end is provided. A lens holder is installed in the housing. The lens holder includes a first side, an opposite second side, and a lens. The lens includes a central axis. The first side and the second side are substantially perpendicular to the central axis. The first side of the lens holder is proximate the first end of the housing. The second side of the lens holder is proximate the second end of the housing. The lens holder is configured to be movable between the first end and the second end of the housing along the central axis. A first magnet member is connected to the first end of the housing. A second magnet member is connected to the lens holder. The second magnet member is proximate the first side of the lens holder. The second magnet member is opposite the first magnet member. The second magnet member is configured to be spaced from the first magnet member in a direction along the central axis.

In accordance with another aspect of the invention, a program storage device readable by a machine, tangibly embodying a program of instructions executable by the machine for performing operations to move a camera lens is disclosed. A direction of desired lens movement is determined. An electromagnetic field actuation system is energized. The lens is positioned in a camera module. The lens is moved in a first direction, a second direction, and/or a third direction in response to the energizing of the electromagnetic field actuation system. The first, the second, and the third directions are each perpendicular to one another.

BRIEF DESCRIPTION OF THE DRAWINGS

The foregoing aspects and other features of the invention are explained in the following description, taken in connection with the accompanying drawings, wherein:

FIG. 3 is a side view of an exemplary camera used in the electronic device shown in FIG. 1;

FIG. 22 is a perspective view of another alternative camera module used in the camera shown in FIG. 3;

FIG. 23 is an exploded assembly view of the camera module shown in FIG. 22;

DETAILED DESCRIPTION OF THE EMBODIMENTS

Figure 1:
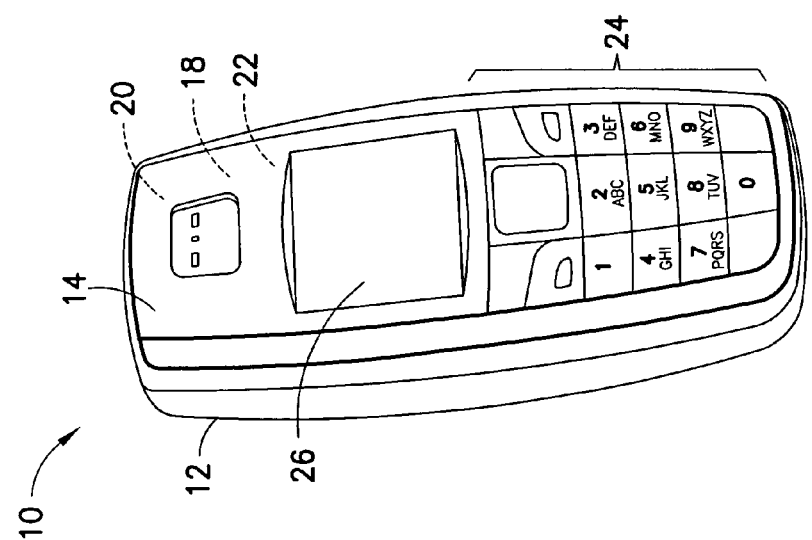
FIG. 1 is a perspective view of a front face of an electronic device incorporation features of the invention.

Referring to FIG. 1, there is shown a perspective view of an electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

Figure 2:
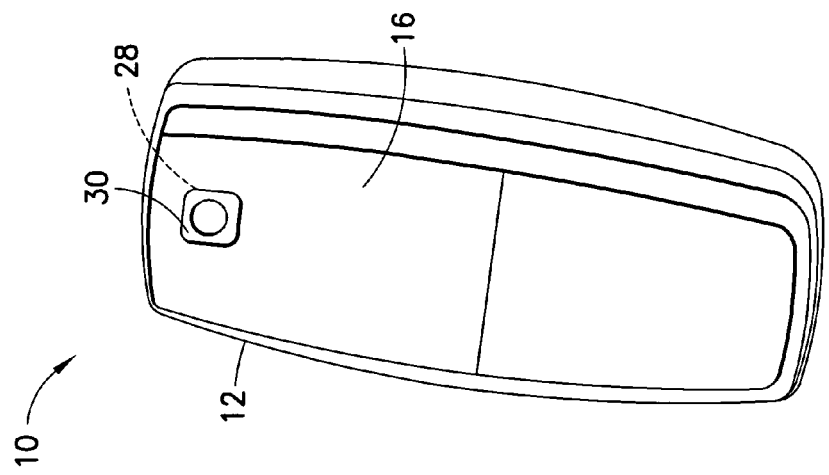
FIG. 2 is a perspective view of a back face of the electronic device shown in FIG. 1.

In the embodiment shown in FIGS. 1 and 2, the device 10 comprises a mobile telephone. However, in alternate embodiments the device could comprise any suitable type of electronic device. For example, the device 10 could comprise a music player, a hand-held gaming device, a PDA, or a notebook computer. The telephone 10 generally comprises a housing 12 having a front face 14 and a back face 16, a transceiver 18 connected to an antenna 20, electronic circuitry 22, such as a controller and a memory for example, within the housing 12, a user input region 24 and a display 26. The display could also form a user input section, such as a touch screen for example. In alternate embodiments, the telephone 10 can have any suitable type of features as known in the art.

The electronic device 10 further comprises a camera 28 (shown in FIG. 2) mounted within the housing 12. The camera may comprise a camera window 30 located at the back face 16 of the housing 12. However, it should be noted that although the figures illustrate the camera window 30 at the back face 14 of the electronic device 10, alternate embodiments may comprise the camera window at any suitable location. For example, the camera window 30 may be provided at the front face 14 or a lateral side face of the housing 12. Additionally, more than one camera and/or camera window may be provided.

Referring now also to FIG. 3, the camera 28 comprises a front portion 32, a back portion 34, an image sensor 36, a shutter 38, and a camera module 40. The camera 28 could comprise a still image digital camera or a video camera, or any other suitable type of image taking device. The camera 28 is suitably mounted inside the housing 12 with the front portion 32 proximate the front face 14 and the back portion 34 proximate the back face 16. It should be noted that the front portion 32 and the back portion 34 may be integral with the housing 12. Additionally, the front portion 32 and/or the back portion 34 may also be connected to a printed wiring board. However, any suitable configuration and/or electrical connection may be provided. For example, the front portion may be proximate the back face of the device 10 and the front portion may be proximate the front face of the device.

The image sensor 36 is aligned with the shutter 38 to receive light from an object through an opening 42 in the back portion 34 (aligned with the camera window 30) and the shutter 38 and form an image on the sensor 36. The camera module 40 is provided between the opening 42 and the shutter 38 to provide autofocus (AF) and/or optical image stabilization (OIS) functions with respect to the light received by the sensor 36 from the shutter 38. The camera module 40 allows for a single middle lens (within the camera module 40) to be movable within the camera instead of a total lens stack. However, it should be noted that alternate embodiments may comprise any suitable number of movable lenses.

Figure 29:
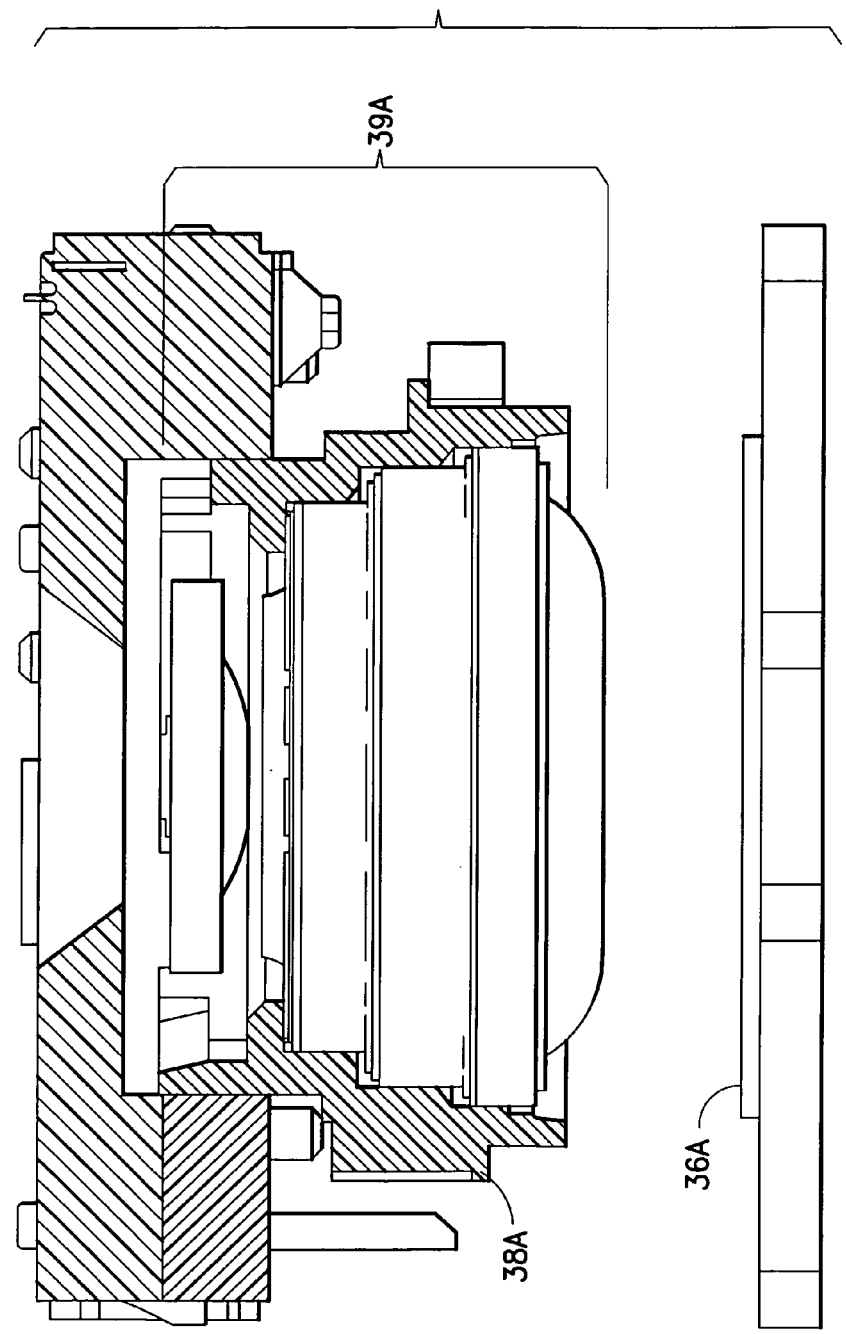
FIG. 29 is a top view of a conventional autofocus configuration.

The camera module 40 provides a combined autofocus and image stabilization arrangement constructed of a set of magnet member pairs (such as electromagnetic coil and magnet pairs, for example). The camera module 40 within the camera 28 provides added camera functionality while maintaining a compact configuration (when compared to conventional configurations having just autofocus functionality, such as the autofocus configuration 28A shown in FIG. 29).

In one embodiment, the camera size may be about 12.5 mm×12.5 mm×9 mm. However, any suitable camera size may be provided. It should be noted that although the figures illustrate a single sensor 36, a single camera module 40, and a single shutter 38, any suitable number of sensors, camera modules, and/or shutters may be provided.

Figure 4:
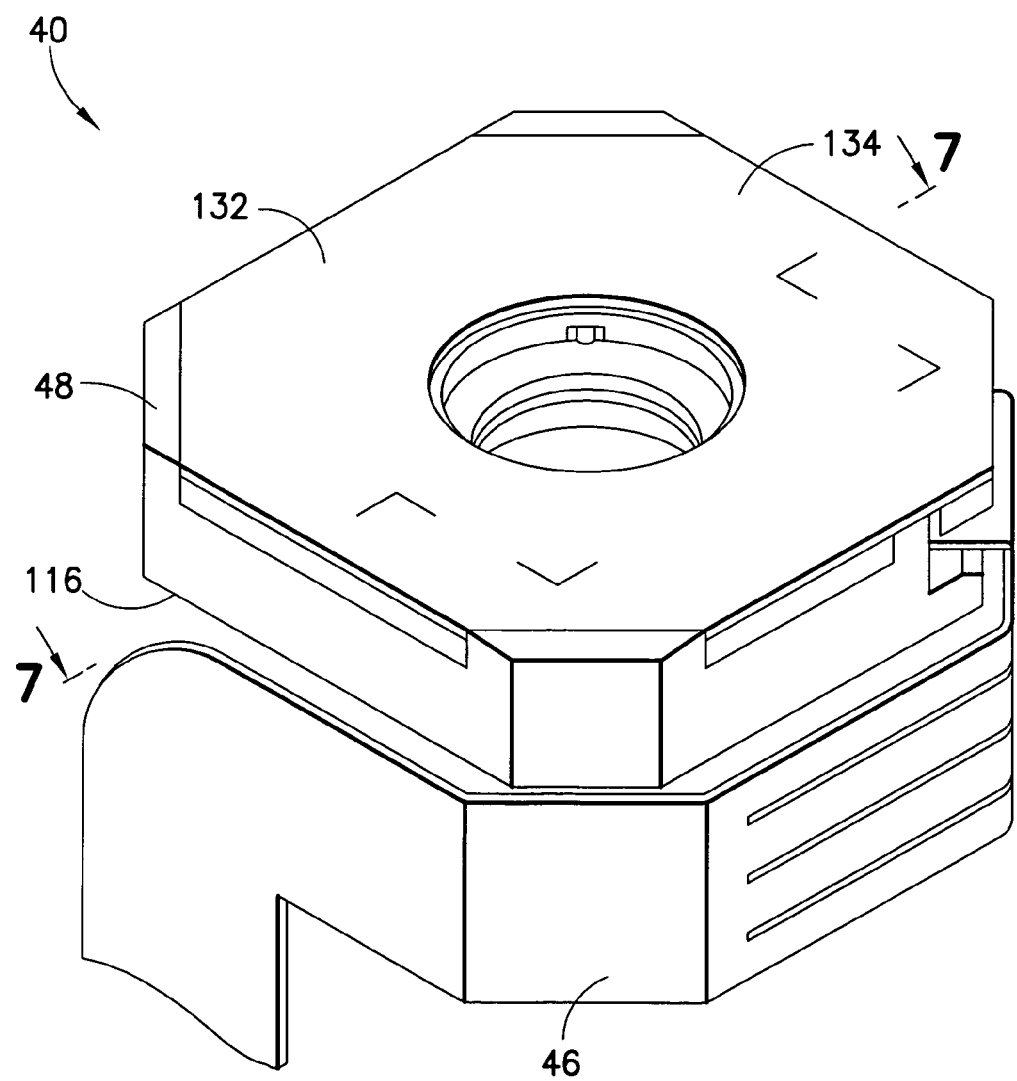
FIG. 4 is a perspective view of an exemplary camera module used in the camera shown in FIG. 3.
Figure 5:
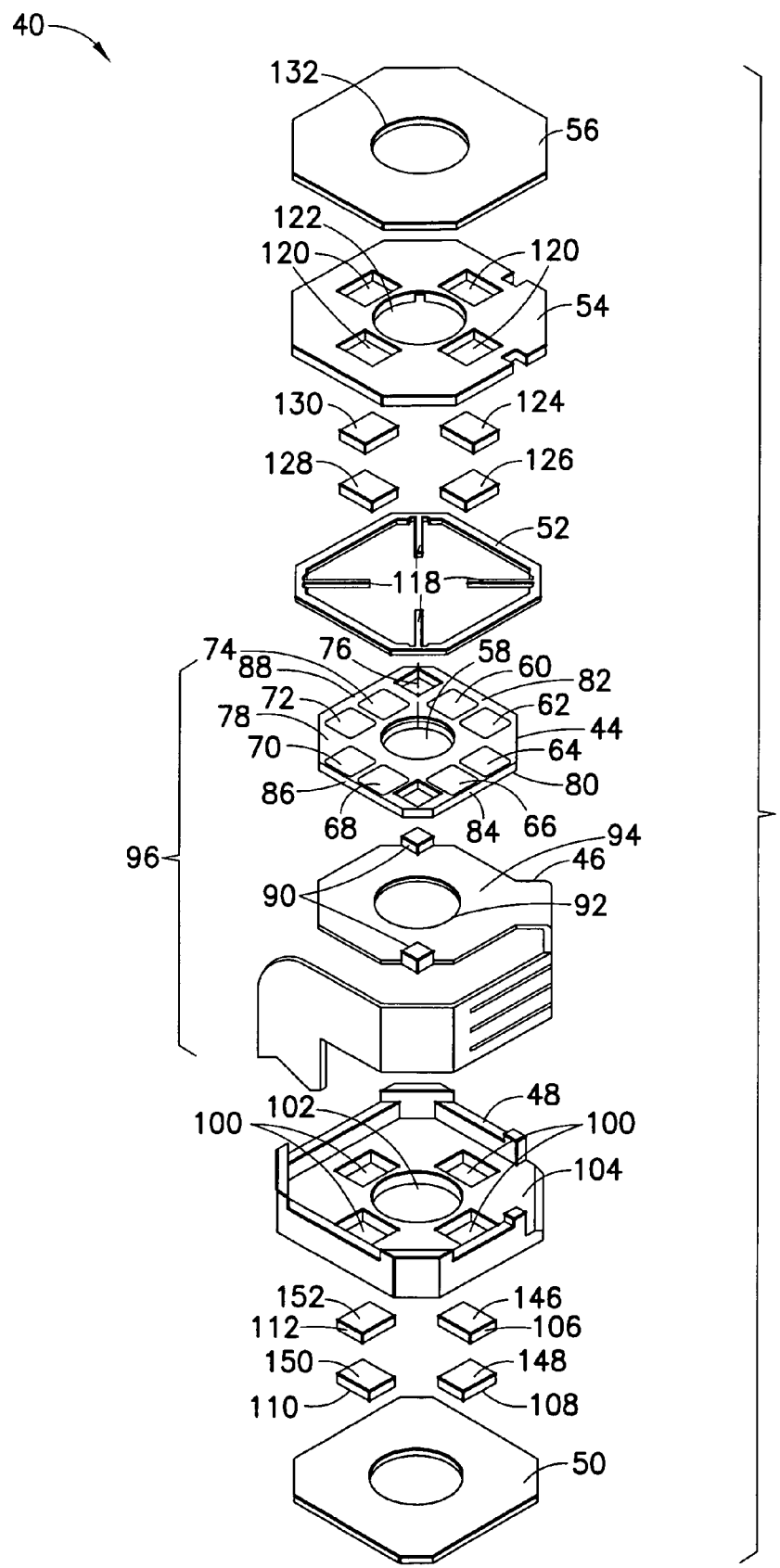
FIG. 5 is an exploded assembly view of the camera module shown in FIG. 4.
Figure 6:
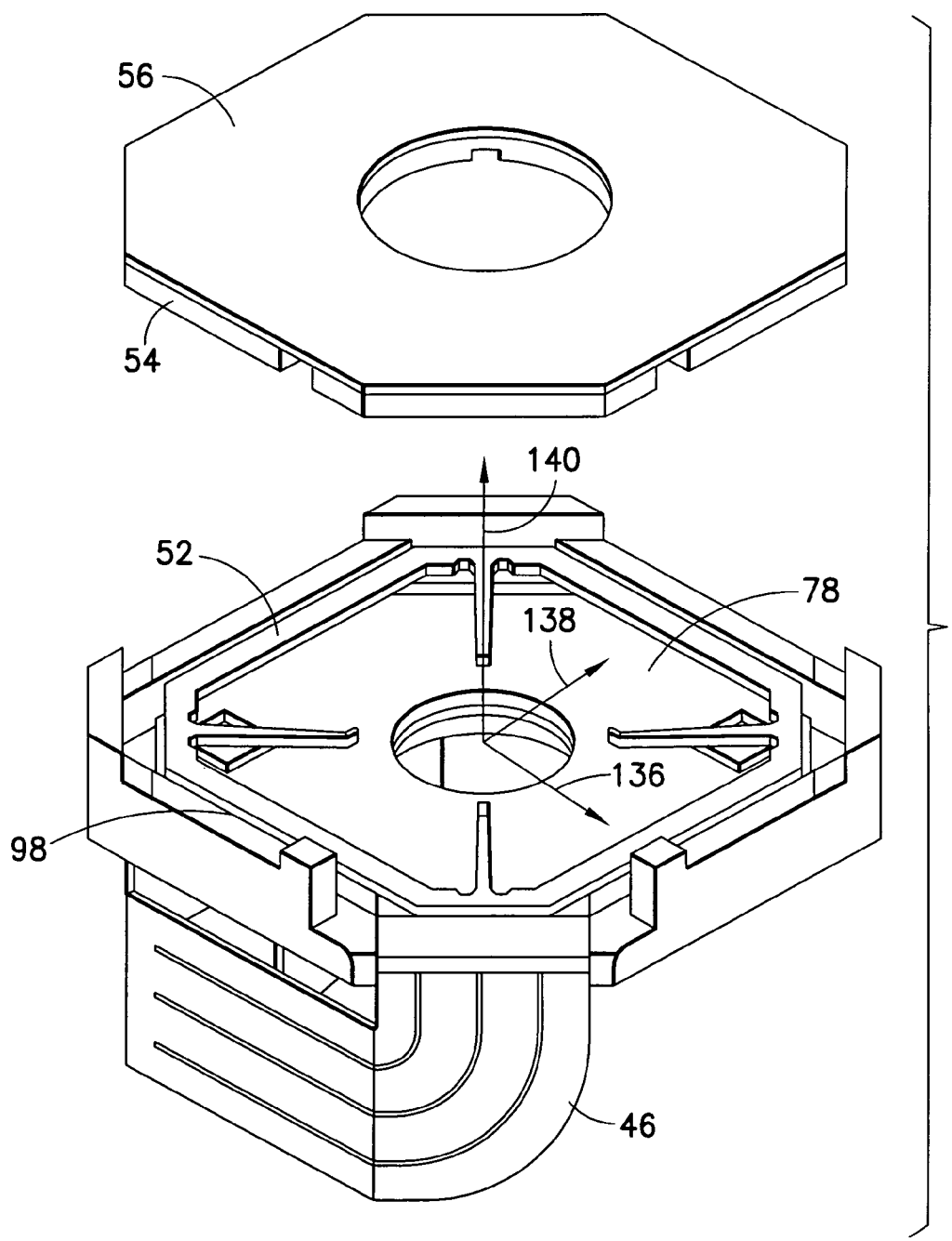
FIG. 6 is a partial exploded assembly view of the camera module shown in FIG. 4.

Referring now also to FIGS. 4-6, the camera module 40 comprises a printed wiring board (PWB) 44, a flexible printed circuit (FPC) cable 46, a main housing 48, a lower yoke part 50, a bias spring 52, an upper frame 54, and an upper yoke part 56.

The printed wiring board 44 comprises a lens 58 and a plurality of magnet members 60, 62, 64, 66, 68, 70, 72, 74 which may be electromagnetic coils for example. In this embodiment, the printed wiring board (or lens holder) 44 comprises a general flat planar shape with the lens 58 at a center portion of the printed wiring board 44. In alternate embodiments, the printed wiring board 44 may comprise any suitable shape. The lens 58 comprises a central axis 76 extending substantially perpendicular to a top side 78 and a bottom side 80 of the printed wiring board 44. The plurality of coils 60, 62, 64, 66, 68, 70, 72, 74 are disposed along an outer portion of the printed wiring board 44 and surround the lens 58. Each of the coils 60, 62, 64, 66, 68, 70, 72, 74 may be a fine pitch pattern coil embedded within the printed wiring board for example. The embedded coils 60, 62, 64, 66, 68, 70, 72, 74 may be provided with suitable methods known in the art, such as coil embedding performed by Asahi-Kasei Company (Japan), for example. However, the coils may be attached to the printed wiring board 44 in any suitable manner and any suitable type of electromagnetic coil may be provided.

The coils 60, 62, 64, 66, 68, 70, 72, 74 are proximate lateral sides 82, 84, 86, 88 of the printed wiring board 44 and are arranged in pairs of coils. For example, the coils 60, 62 are aligned next to each other and are proximate the first lateral side 82 of the printed wiring board 44. The coils 64, 66 are aligned next to each other and are proximate the second lateral side 84 of the printed wiring board 44. The coils 68, 70 are aligned next to each other and are proximate the third lateral side 86 of the printed wiring board 44. The coils 72, 74 are aligned next to each other and are proximate the fourth lateral side 88 of the printed wiring board 44.

The FPC cable 46 is attached to the bottom side 80 of the printed wiring board 44. The FPC cable 46 comprises sensors 90 and an opening 92. The sensors 90 protrude from a mating face 94 of the cable 46 and are configured to extend through the printed wiring board 44. The sensors 90 may be hall type sensors for example. The opening 92 may be provided between the sensors 90 and is aligned with the lens 58. The cable 46 and the printed circuit board 44 are connected together to form a "floating" assembly 96 which is movable inside the camera module 40. It should be noted that the cable 46 is not required to be a flexible printed circuit cable and any other suitable type of flat cable may be provided, such as a flexible flat conductor (FFC) cable for example.

The main housing 48, which may be fabricated from plastic for example, comprises a main receiving area 98, magnet openings 100, and a lens opening 102. The main receiving area 98 is sized and shaped to receive the printed wiring board 44 and the cable 46. The outer profile of the connected printed wiring board 44 and the cable 46 is generally smaller than the receiving area 98 of the main housing 48 such that outer edges of the printed wiring board 44 (and the cable 46) are spaced from inside walls of the main housing 48. The main housing 48 also comprises an open section 104 suitably sized and shaped to allow a portion of the cable 46 to extend therethrough.

The magnet openings 100 are sized and shaped to receive a plurality of magnet members 106, 108, 110, 112 (or lower magnets). The lower magnets 106, 108, 110, 112, which may be permanent magnets for example, are fitted within the openings 100 and are aligned opposite the coils 60, 62, 64, 66, 68, 70, 72, 74. In this embodiment, one lower magnet is aligned opposite a pair of coils. In particular, each magnet is disposed within the main housing 48 so as to be centered between each opposing pair of magnets. For example, the lower magnet 106 is opposite (and centered between) the coils 60, 62. The lower magnet 108 is opposite (and centered between) the coils 64, 66. The lower magnet 110 is opposite (and centered between) the coils 68, 70. The lower magnet 112 is opposite (and centered between) the coils 72, 74. However, it should be noted that any number or configuration of lower magnets may be provided.

The lens opening 102 is generally centered at a base portion of the main housing 48 and configured to be opposite the lens 58. The lens opening 102 is suitably sized and shaped to maintain alignment with the lens 58 upon movement of the floating assembly 96 within the camera module 40.

The lower yoke part 50 comprises a general flat planar shape and is attached to the base portion of the main housing 48. The lower yoke part 50 comprises an opening 114 aligned with the lens 58. The lower yoke part 50 forms a bottom side (or end) 116 of the camera module 40 and may also provide support for the lower magnets 106, 108, 110, 112.

The spring 52 is fitted within the main receiving area 98 over the printed wiring board 44 (best shown in FIG. 6). The spring 52 contacts the top side 78 of the printed wiring board 44 to provide a bias force. The spring 52 comprises arm sections 118 extending inward in a general cantilevered fashion from a body portion of the spring 52. The arm sections 118 are sized and shaped to extend between the coil pairs. However, alternate embodiments may comprise any suitably sized and shaped spring which provides a bias force on the printed wiring board.

The upper frame 54, which may be fabricated from plastic for example, comprises a general flat planar shape with magnet openings 120, and a lens opening 122. Similar to the main housing 48, the magnet openings 120 are sized and shaped to receive a plurality magnet members, or upper magnets 124, 126, 128, 130. The upper magnets 124, 126, 128, 130, which may be permanent magnets for example, are fitted within the openings 120 and are aligned opposite the coils 60, 62, 64, 66, 68, 70, 72, 74. In this embodiment, one upper magnet is aligned opposite a pair of coils. In particular, each magnet is disposed within the upper frame 54 so as to be centered between each opposing pair of magnets. For example, the upper magnet 124 is opposite (and centered between) the coils 60, 62. The upper magnet 126 is opposite (and centered between) the coils 64, 66. The upper magnet 128 is opposite (and centered between) the coils 68, 70. The upper magnet 130 is opposite (and centered between) the coils 72, 74. However, it should be noted that any number or configuration of upper magnets may be provided.

The lens opening 122 is located at a general center portion of the upper frame 54 and is configured to be opposite the lens 58. The lens opening 122 is suitably sized and shaped to maintain alignment with the lens 58 upon movement of the floating assembly 96 within the camera module 40.

The upper yoke part 56 comprises a general flat planar shape and is attached to the upper frame 54. Similar to the lower yoke part 50, the upper yoke part 56 comprises an opening 132 aligned with the lens 58. The upper yoke part 56 forms a top side (or end) 134 of the camera module 40 and may also provide support for the upper magnets 124, 126, 128 130.

The camera module 40 provides autofocus and optical image stabilization control functions with movement of the "floating" assembly (comprising the printed wiring board 44 and the cable 46) 96. The "floating" assembly 96 is moved within the camera module 40 by utilizing electromagnetism. The upper magnets 124, 126, 128, 130 and the lower magnets 106, 108, 110, 112 (supported by the upper yoke part 56 and the lower yoke part 50) provide interacting magnetic forces with the coils 60, 62, 64, 66, 68, 70, 72, 74 to move the lens in X, Y, and Z directions 136, 138, 140. The upper magnets, the lower magnets, and the coils form an electromagnetic actuation system 142. Additionally, the bias spring 52 is provided to accommodate movement along the Z direction 140. It should be noted that when the printed wiring board 44 is assembled inside the camera module 40, the central axis 76 of the lens and the Z direction 140 extend in substantially the same direction.

In general, interacting magnetic forces may be provided when, for example, a magnet with a north (N) or a south (S) pole is placed on top of a coil, and the coil is powered so that opposite pole is generated, the magnet "jumps up" since generated magnetic field moves it. The required autofocus control function can be implemented with this actuator since the required movement for the lenses is very low (for example about 0.3 mm to about 0.5 mm).

Figure 7:
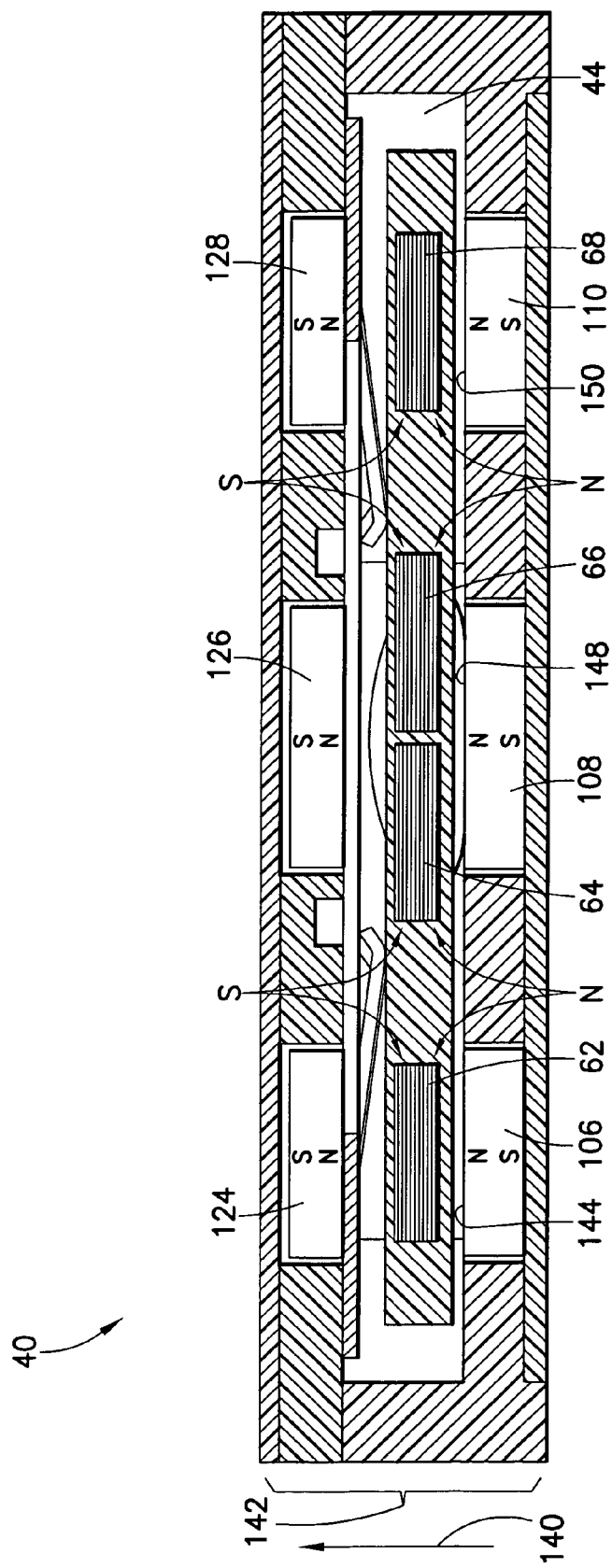
FIG. 7 is a cross section view of the camera module shown in FIG. 4 taken along lines 7-7.

FIG. 7 illustrates a cross-section view of the camera module 40. The printed wiring board 44 is spaced between the upper magnets 124, 126, 128, 130 and the lower magnets 106, 108, 110, 112 and is configured to be movable within the main receiving area 98 in response to magnetic field interactions between the magnet members. The movement of the printed wiring board 44 in the Z direction 140 provides for an autofocus control function. The autofocus control function provides for the moving of the optical lens 58 inside the camera module 40. The autofocus control function moves the lens 58 in order to create a sharp image (autofocus) or make images larger (zoom). For example, in this embodiment, energizing north (N) and south (S) fields to the coils 60, 62, 64, 66, 68, 70, 72, 74 moves the printed wiring board 44 (with the lens 58) up against the bias spring 52 (i.e. the upper magnets 124, 126, 128, 130 pull and the lower magnets 106, 108, 110, 112 push the lens holder 44 up in the Z direction 140) and away from the lower magnets 106, 108, 110, 112. This movement of the printed wiring board 44 is provided by the interaction of magnetic fields wherein the coils 60, 62, 64, 66, 68, 70, 72, 74 move in a direction substantially normal to surfaces 144, 146, 146, 150 of the magnets 106, 108, 110, 112 (and along the Z direction 140). This lens 58 movement may be desired for a "close-up" (macro) image, for example. However, any suitable autofocus/zoom lens movement may be provided.

Autofocus functions have become increasingly popular in conventional camera modules inside mobile phones. However, the conventional camera modules comprise large actuation systems which are difficult to implement in small electronic devices. The camera module 40 provides a solution to the challenges of miniaturization while maintaining high resolution, good optics quality, processability, and reflowability.

Figure 8:
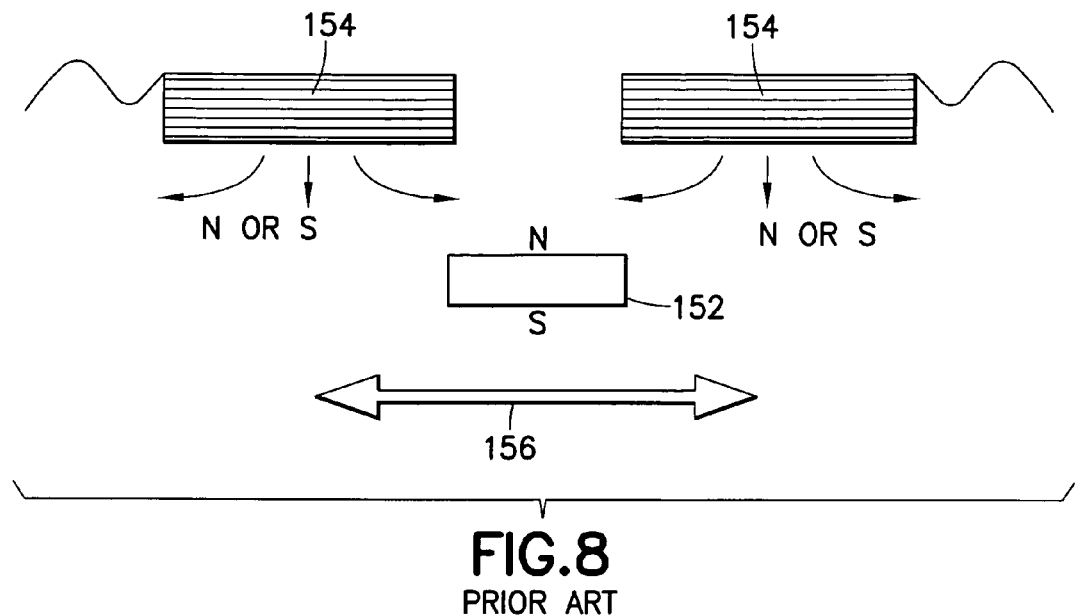
FIG. 8 is a diagram of a conventional coil-magnet configuration.
Figure 30:
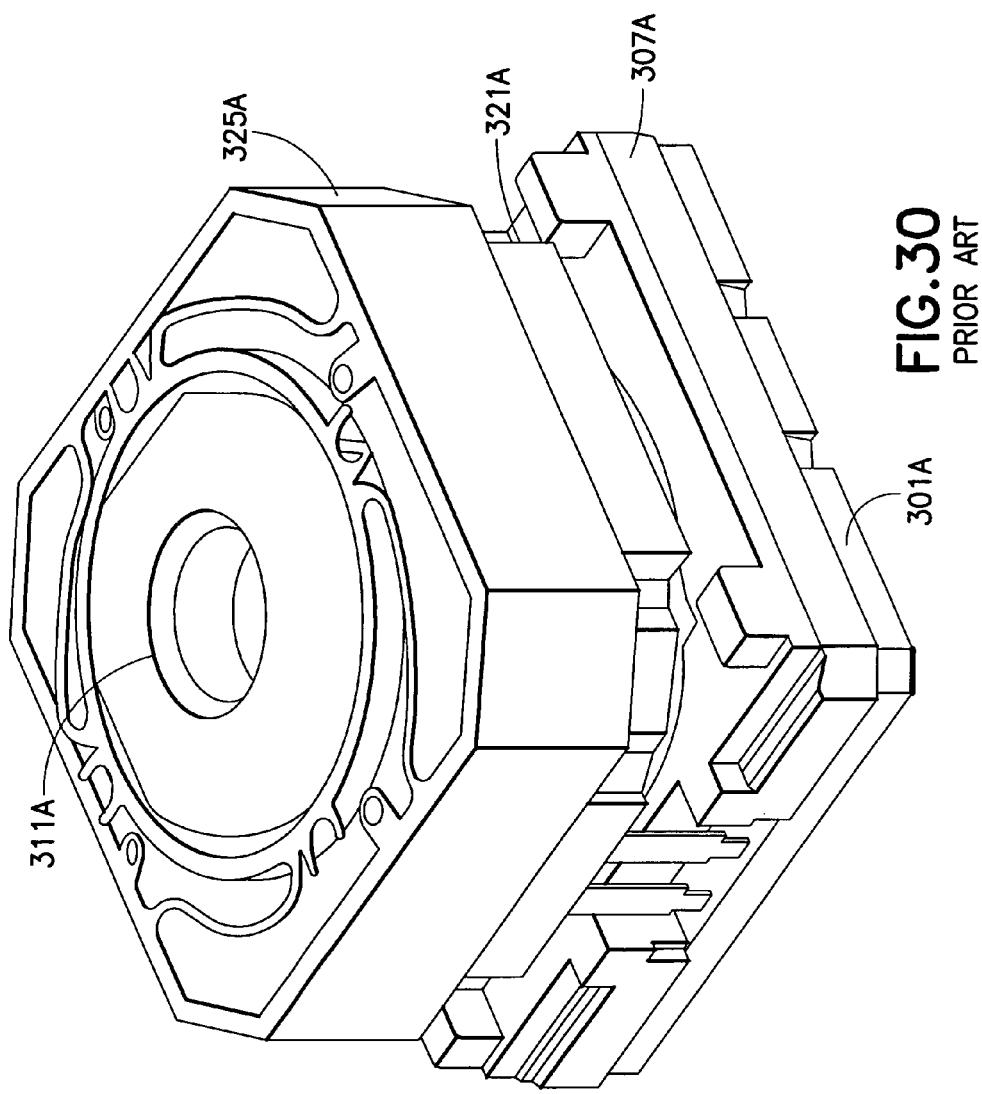
FIG. 30 is a perspective view of another conventional autofocus configuration.
Figure 31:
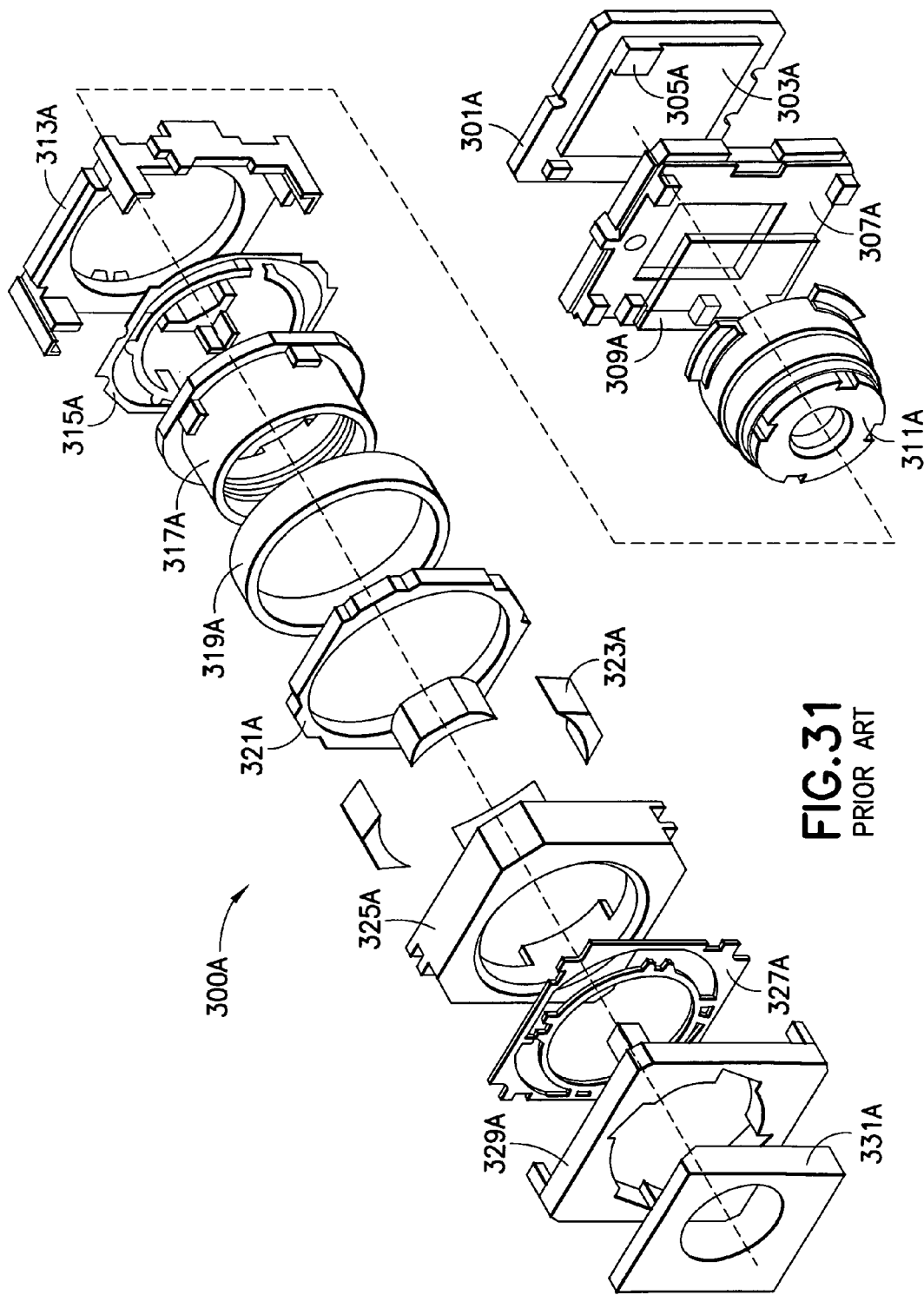
FIG. 31 is an exploded perspective view of the conventional autofocus configuration shown in FIG. 30.

An advantage of the camera module 40 is that a smaller camera module size may be achieved by a change in the direction of the electromagnetic actuation. For example, FIG. 8 illustrates a conventional electromagnetic actuation configuration. Conventional configurations utilize the electromagnetic force such that a permanent magnet (or coil) 152 is moved in a parallel fashion relative opposing coils (or permanent magnets) 154 along direction 156 (such as in the Sony Corporation model DSC T9, and the conventional autofocus configuration 300A shown in FIGS. 30 and 31, for example). The camera module 40 is configured to provide for interaction of the magnetic fields wherein the direction of the electromagnetic field (or effect) is changed by about ninety degrees with respect to conventional configurations (see FIG. 9). The interacting magnetic fields in the camera module 40 allows for the coil 60, 62, 64, 66, 68, 70, 72, 74 to move closer to or away from the magnet 106, 108, 110, 112, 124, 126, 128, 130 along direction 140. This allows for a smaller, more compact configuration.

Figure 10:
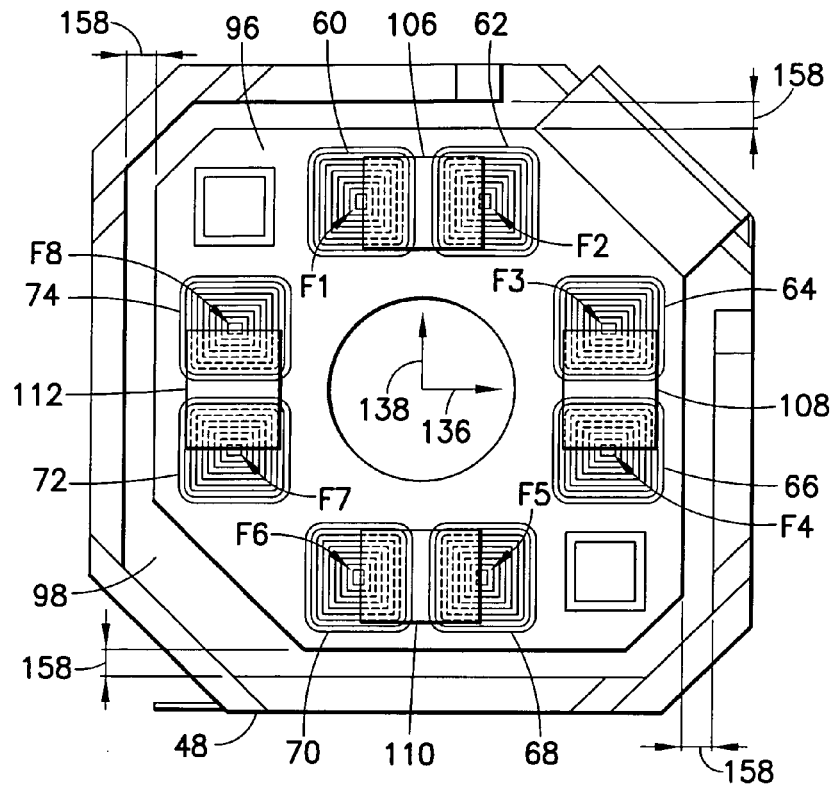
FIG. 10 is a top view inside the top end of the camera module shown in FIG. 4.
Figure 11:
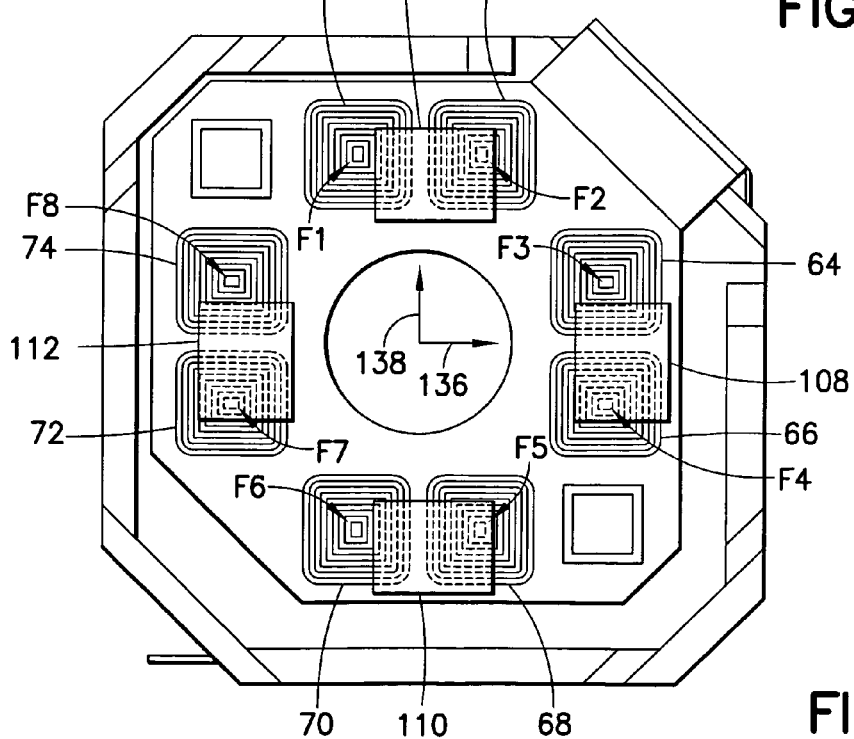
FIG. 11 is a top view inside the top end of the camera module shown in FIG. 4 with a lens holder in a first shifted position.

FIGS. 10 and 11 illustrate top views inside the camera module 40. The space 158 between the outer profile of the floating assembly 96 and the side walls of the main housing 48 allows for movement along the X direction 136 and the Y direction 138 for optical image stabilization control functions. For example, FIG. 10 illustrates a full magnetic force (Fn) on each magnet 106, 108, 110, 112. This may be provided by applying the same amount of current to each of the coils 60, 62, 64, 66, 68, 70, 72, 74. This keeps the coil pairs centered on the corresponding magnets and the printed circuit board 44 centered within the main receiving area 98.

FIG. 11 illustrates the full magnetic force (Fn) shared between the magnets 106, 108, 110, 112. This may be provided by applying the different amounts of current to each of the coils 60, 62, 64, 66, 68, 70, 72, 74. For example, a greater amount of current may be applied to one of the coils in each of the pairs of coils (as shown in FIG. 11). In one example, the forces may be described as F1>F2 (for the coils 60, 62), F3>F4 (for the coils 64, 66), F6>F5 (for the coils 68, 70), and F8>F7 (for the coils 72, 74). In another example, the forces may be describes as F1=F1+F2, F3=F3+F4, F6=F5+F6, and F8=F7+F8. The forces shift the lens holder 44 in the X direction 136 and the Y 138 direction (up and to the left) as shown in FIG. 11. The total resulting magnetic force on the coils may be kept the same in order to keep the autofocus position (in the Z direction) fixed, but the force is shared between the adjacent coils in order to create horizontal movement. This allows for the optical image stabilization control functions to be used at any time in between inf-macro modes, for example.

Optical image stabilization (OIS) is desirable when taking an image with high resolution/zoom factor, low sensitivity sensor, long exposure time (night-shot) and with a lightweight device (e.g. mobile phone), as hand shaking can very easily result in blurred, out-of-focus images.

Conventional solutions for preventing and/or minimizing blurred, out-of-focus images have included using a rigid fixture for the camera (e.g. tripod) during shooting, and increasing the weight of the camera device so that shaking has less effect. Although somewhat effective, these solutions are not practical as tripods are not always available and are bulky to carry, and increasing the weight of the device not desirable for end users.

Additionally, some larger conventional devices, such as mid-range digital still cameras (manufactured by Panasonic Corporation for example) have built-in stabilization systems. However, there has been no implementation of optical image stabilization systems in small electronic devices, such as commercially available mobile phones for example.

As described above, with reference to FIGS. 10 and 11, the floating lens assembly 44 which is movable in response to electromagnetic actuators (magnets 106, 108, 110, 112, 124, 126, 128, 130 and coils 60, 62, 64, 66, 68, 70, 72, 74) provides an optical image stabilizer to the device. By moving the lens 58 into an opposite direction as an unwanted vibration from hand shaking, an image is kept stable on the camera sensor 36. Embodiments of the invention having a movable lens provide an optical image stabilizer (or anti-shake) application with a much more space efficient and practical size-wise implementation when compared to conventional configurations.

Due to the requirements of modern product creation, miniaturization has become more critical factor nowadays and the trend will continue. Embodiments of the invention provide a minimalistic optical image stabilization configuration having fewer parts and increased functionality.

Figure 12:
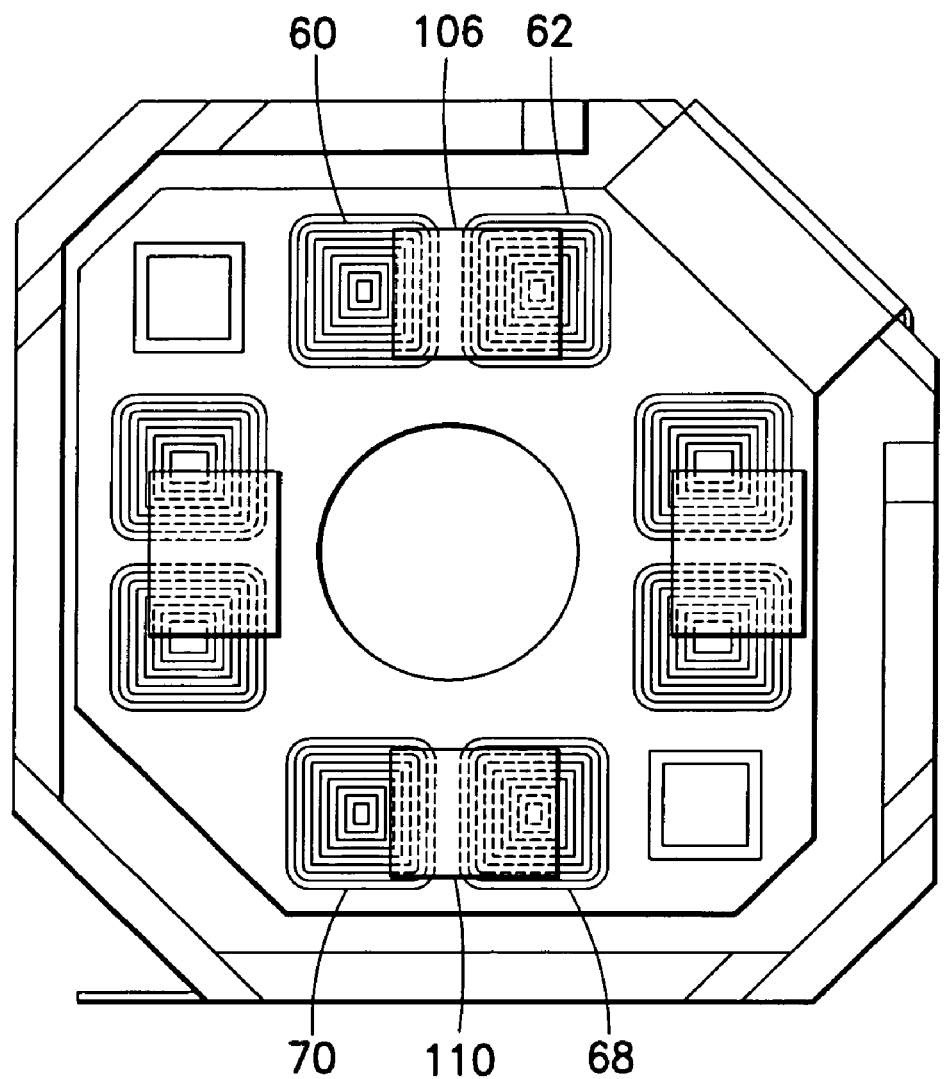
FIG. 12 is a top view inside the top end of the camera module shown in FIG. 4 with the lens holder in a second shifted position.
Figure 13:
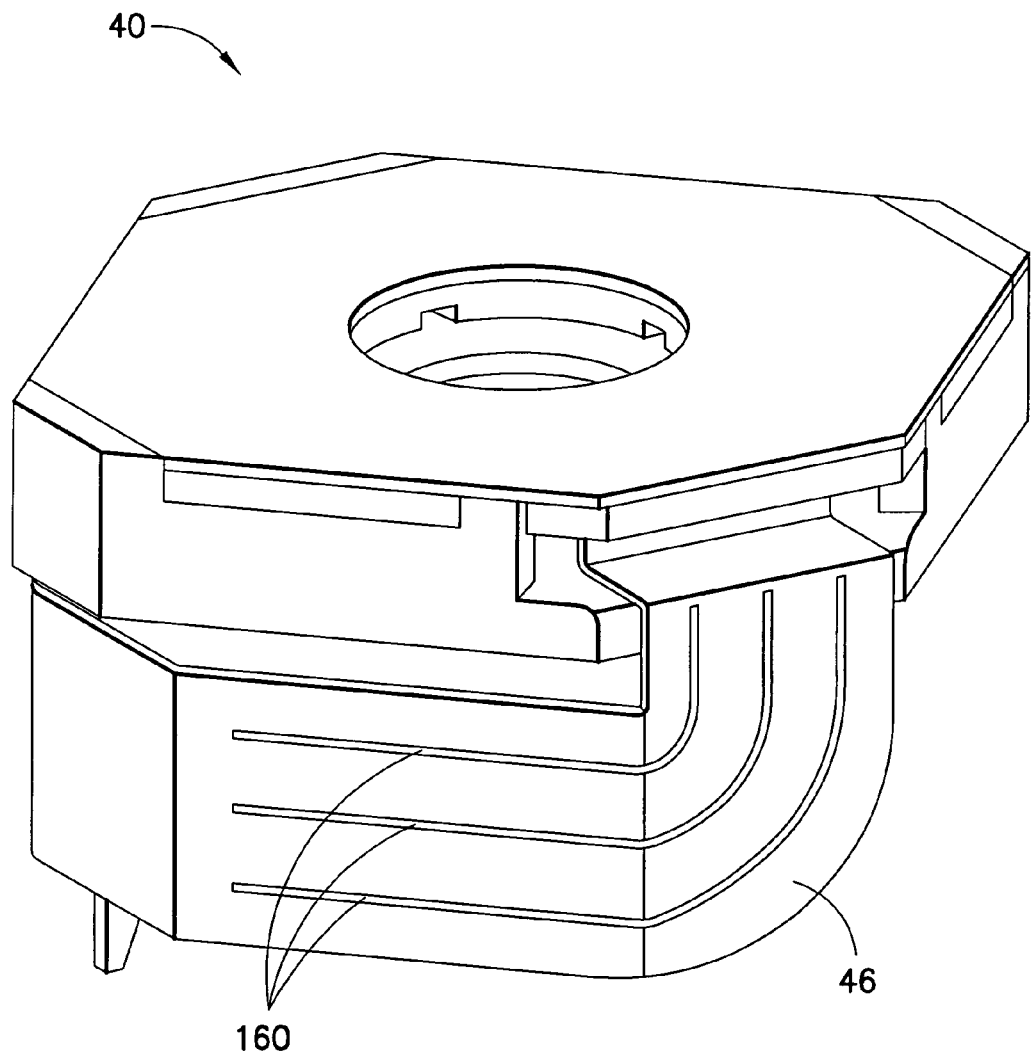
FIG. 13 is a perspective view of the camera module shown in FIG. 4.

Selective application of the current to the coils 60, 62, 64, 66, 68, 70, 72, 74 may also be provided for lens alignment operations. For example, FIG. 12 illustrates the printed wiring board 44 (and the lens 58) moved to the left (along the X direction 136), with respect to FIG. 10, as the two coils 60, 70 are energized and the two coils 62, 68 are de-energized. In order to prevent tilting of the lens unit 44 during OIS function, the x-y-movements are done with two opposite coils which keep the lens rotation fixed (linear guidance by field).

A strong magnetic force is generated with the eight magnets 106, 108, 110, 112, 124, 126, 128, 130 with yoke plates 50, 56 to provide a robust configuration for implementing the autofocus and optical image stabilization control functions. This robust configuration helps to overcome the stress from the attached FPC cable 46. However, in order to facilitate X direction 136 and Y direction 138 bending for the FPC cable 46, laser cut slits 160 may be provided between the lines (conductors) on the FPC cable 46 (best shown in FIG. 11).

This may be referred to as a WireFlex concept. The slits 160 reduce the rigidity of a wide FPC cable and minimize the stress to the floating lens assembly 44. The laser cut slits 160 provide for an advantageous configuration as conventional FPC cables do not allow for bending/shifting in these directions. The appearance of the FPC conductors are becoming close to micro cables.

It should be noted that although separate descriptions of the autofocus and optical image stabilization control functions have been provided, the control function movements may also be provided as combined movements in the X direction 136, the Y direction 138, and the Z direction 140.

Embodiments of the invention provide for significant advantages over conventional configurations by accommodating multiple functions with a single lens. For example, the lens 58 of the camera module 40 is movable in the X direction 136, the Y direction 138, and the Z direction 140 to provide autofocus and optical image stabilization control functions. Additionally, the vertical arrangement (along the Z direction 140) of the coils and magnets provides for a lens driving mechanism having a reduced size.

Figure 14:
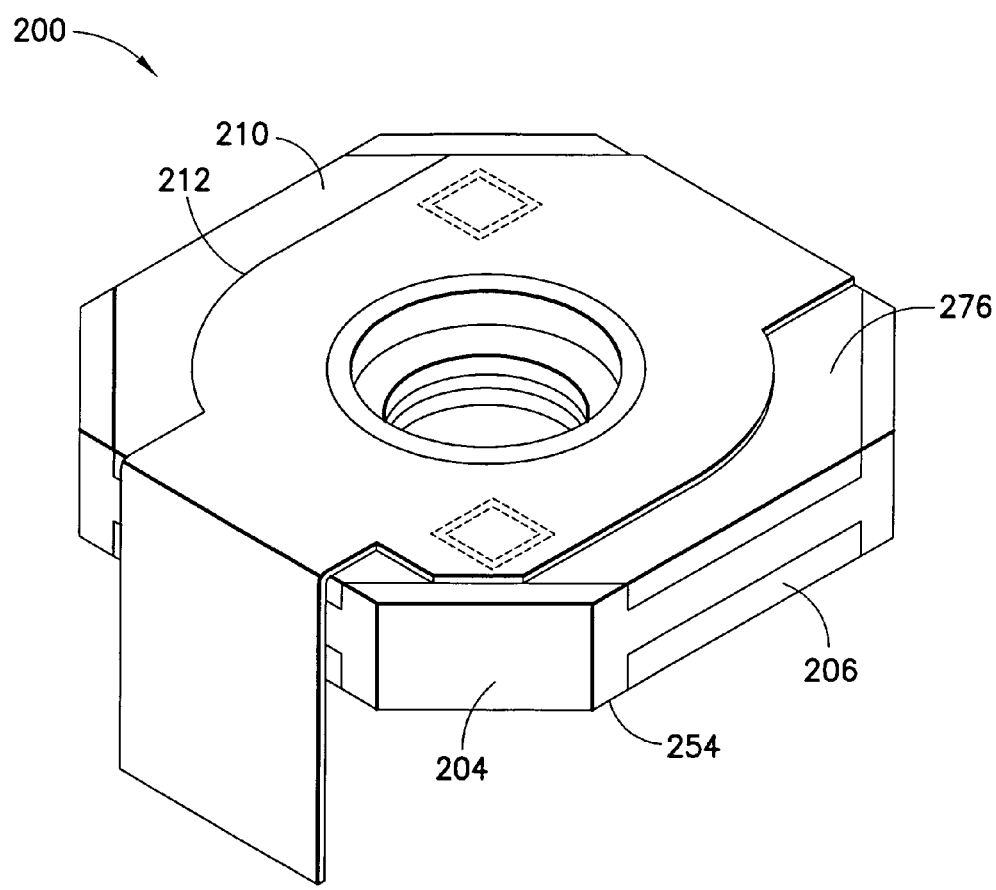
FIG. 14 is a perspective view of an alternative camera module used in the camera shown in FIG. 3.
Figure 15:
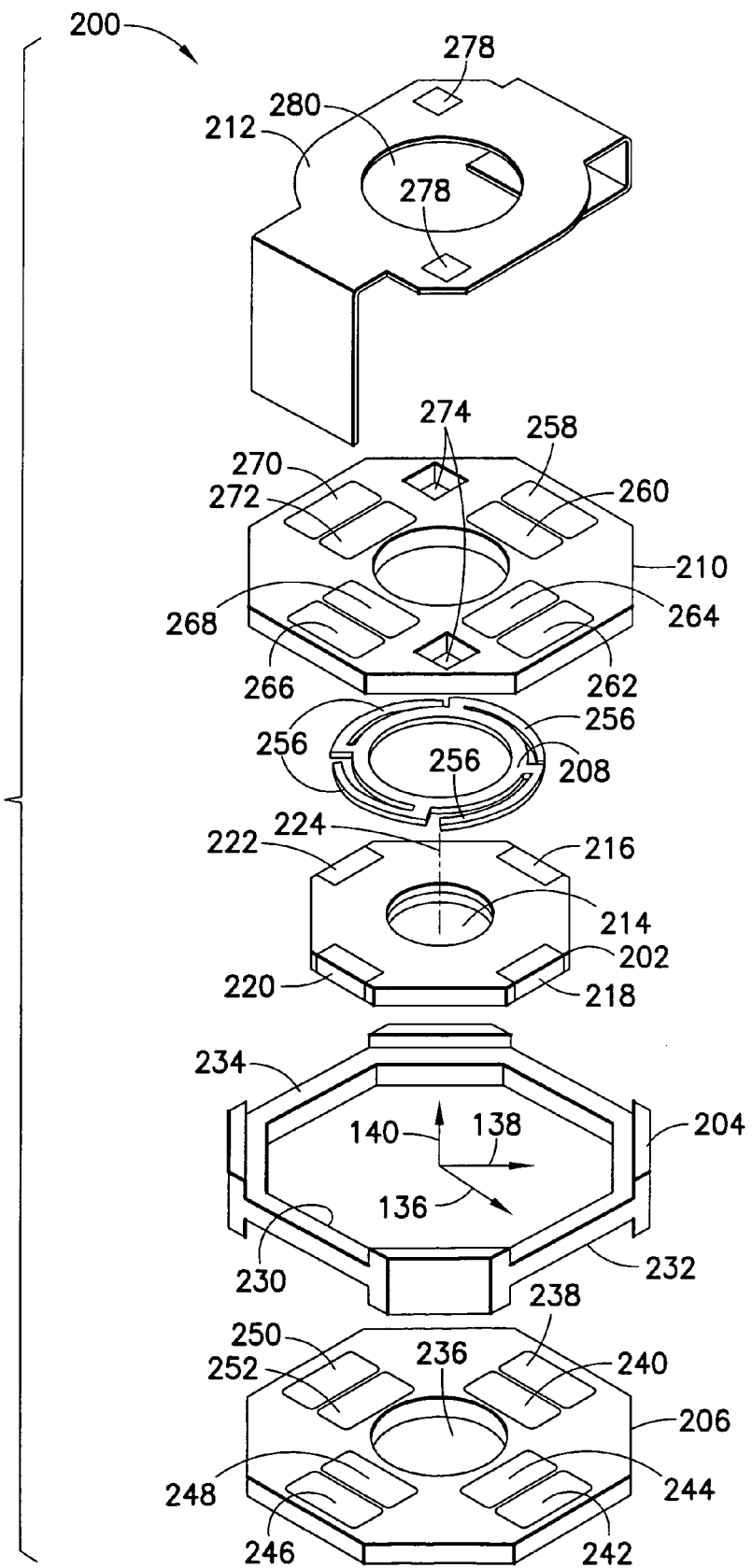
FIG. 15 is an exploded assembly view of the camera module shown in FIG. 14.

FIGS. 14-15 illustrate a camera module 200 in accordance with a second embodiment of the invention. The camera module 200 comprises a floating lens unit 202, a housing frame 204, a lower printed wiring board 206, a spring 208, an upper printed wiring board 210, and an FPC cable 212.

The floating lens unit 202 comprises a lens 214 and a plurality of magnet members, or magnets 216, 218, 220, 222. In this embodiment, the floating lens unit (or lens holder) 202 comprises a general flat planar shape with the lens 214 at a center portion of the floating lens unit 202. In alternate embodiments, the floating lens unit 202 may comprise any suitable shape. The lens 214 comprises a central axis 224 extending substantially perpendicular to a top side 226 and a bottom side 228 of the floating lens unit 202. The plurality of magnets 216, 218, 220, 222, which may be permanent magnets for example, are disposed along outer portions of the floating lens unit 202 and extend between the top side 226 and the bottom side 228. The magnets 216, 218, 220, 222 may be attached to the floating lens unit 202 by any suitable means.

The housing frame 204, which may be fabricated from plastic for example, comprises a main receiving area 230, a first side 232, and a second side 234. The main receiving area 230 is sized and shaped to receive the floating lens unit 202. The outer profile of the floating lens unit is generally smaller than the receiving area 230 of the housing frame such that outer edges of the floating lens unit 202 are spaced from inside walls of the housing frame 204.

The lower printed wiring board 206 comprises an opening 236 and a plurality of magnet members, or electromagnetic coils 238, 240, 242, 244, 246, 248, 250, 252. The lower printed wiring board 206 also forms a bottom side (or end) 254 of the camera module 200. The lower printed wiring board 206 may have a general flat planar shape and is attached to the first side 232 of the housing frame 204. The opening 236 is located at a center portion of the printed wiring board 206 and configured to be opposite the lens 214. The lens opening 236 is suitably sized and shaped to maintain alignment with the lens 214 upon movement of the floating lens unit 202 within the camera module 200.

The plurality of coils 238, 240, 242, 244, 246, 248, 250, 252 are disposed along an outer portion of the lower printed wiring board 206 and surround the opening 236. Each of the coils may be a fine pitch pattern coil embedded within the printed wiring board 206. However, the coils may be attached to the printed wiring board in any suitable manner and any suitable type of electromagnetic coils may be provided. The coils 238, 240, 242, 244, 246, 248, 250, 252 are arranged in pairs and are spaced such that one of the pair of coils is proximate a lateral side of the lower printed wiring board, and the other of the pair of coils is proximate the opening 236. The pairs of coils 238, 240, 242, 244, 246, 248, 250, 252 are suitably arranged to be aligned opposite the magnets 216, 218, 220, 222. In particular, the pairs of coils are arranged on the lower printed circuit board so as to be centered with respect to the opposing magnet. For example, the coils 238, 240 are opposite the magnet 216 such that the coils 238, 240 are centered with respect to the magnet 216. The coils 242, 244 are opposite the magnet 218 such that the coils 242, 244 are centered with respect to the magnet 218. The coils 246, 248 are opposite the magnet 220 such that the coils 246, 248 are centered with respect to the magnet 220. The coils 250, 252 are opposite the magnet 222 such that the coils 250, 252 are centered with respect to the magnet 222. However, it should be noted that any number or configuration of coils may be provided on the lower printed circuit board.

The spring 208 is fitted within the main receiving area 230 over the floating lens unit 202. The spring 208 contacts the top side 226 of the floating lens unit 202 to provide a bias force. The spring 208 comprises curved arm sections 256 extending along outer portions of the spring 208 in a general cantilevered fashion. However, alternate embodiments may comprise any suitably sized and shaped spring which provides a bias force on the printed wiring board.

The upper printed wiring board 210 comprises an opening 258, a plurality of magnet members, or electromagnetic coils, 258, 260, 262, 264, 266, 268, 270, 272 and sensor openings 274. The upper printed wiring board 210 also forms a top side (or end) 276 of the camera module 200. The upper printed wiring board 210 may have a general flat planar shape and is attached to the second side 234 of the housing frame 204 (over the floating lens unit 202 and the spring 208). The opening 258 is located at a center portion of the upper printed wiring board 210 and is configured to be opposite the lens 214. The lens opening 258 is suitably sized and shaped to maintain alignment with the lens 214 upon movement of the floating lens unit 202 within the camera module 200.

Similar to the lower printed wiring board 206, the plurality of coils 258, 260, 262, 264, 266, 268, 270, 272 are disposed along an outer portion of the upper printed wiring board 210 and surround the opening 258. Each of the coils may be a fine pitch pattern coil embedded within the upper printed wiring board 210. However, the coils may be attached to the upper printed wiring board in any suitable manner and any suitable type of electromagnetic coil may be provided. The coils are arranged in pairs and are spaced such that one of the pair of coils is proximate a later side, and the other of the pair of coils is proximate the opening. The pairs of coils are suitably arranged to be aligned opposite the magnets. In particular, the pairs of coils are arranged on the upper printed circuit board so as to be centered with respect to the opposing magnet. For example, the coils 258, 260 are opposite the magnet 216 such that the coils 258, 260 are centered with respect to the magnet 216. The coils 262, 264 are opposite the magnet 218 such that the coils 262, 264 are centered with respect to the magnet 218. The coils 266, 268 are opposite the magnet 220 such that the coils 266, 268 are centered with respect to the magnet 220. The coils 270, 272 are opposite the magnet 222 such that the coils 270, 272 are centered with respect to the magnet 222. However, it should be noted that any number or configuration of coils may be provided on the upper printed circuit board.

The FPC cable 212 is attached to the upper printed wiring board 210. The FPC cable 212 comprises sensors 278 and an opening 280. The sensors 278 protrude from a mating face of the cable 212 and are configured to extend through the sensor openings 274 in the upper printed wiring board 210. The sensors 278 may be hall type sensors for example. The opening 280 may be provided between the sensors 278 and is aligned with the lens 214. It should be noted that the cable is not required to be a flexible printed circuit cable and any other suitable type of flat cable may be provided, such as a flexible flat conductor (FFC) cable for example.

One advantage of the camera module 200 configuration is that there is no FPC cable stress on the floating lens unit 202. This promotes the free movement of the lens unit 202 and reduces the total mass of the lens unit 202.

The camera module 200 operates in a similar fashion to the camera module 40. The camera module 200 provides autofocus and optical image stabilization control functions with movement of the floating lens unit 202. The floating lens unit 202 is moved within the camera module 200 by utilizing electromagnetism. The coils in the upper printed circuit board and the coils in the lower printed circuit board provide interacting magnetic forces with the magnets to move the lens in the X, Y, and Z directions 136, 138, 140. The coils in the upper printed circuit board 258, 260, 262, 264, 266, 268, 270, 272, the coils in the lower printed wiring board 238, 240, 242, 244, 246, 248, 250, 252, and the magnets 216, 218, 220, 222 form an electromagnetic actuation system 282. Additionally, the bias spring is provided to accommodate movement along the Z axis 140.

Figure 17:
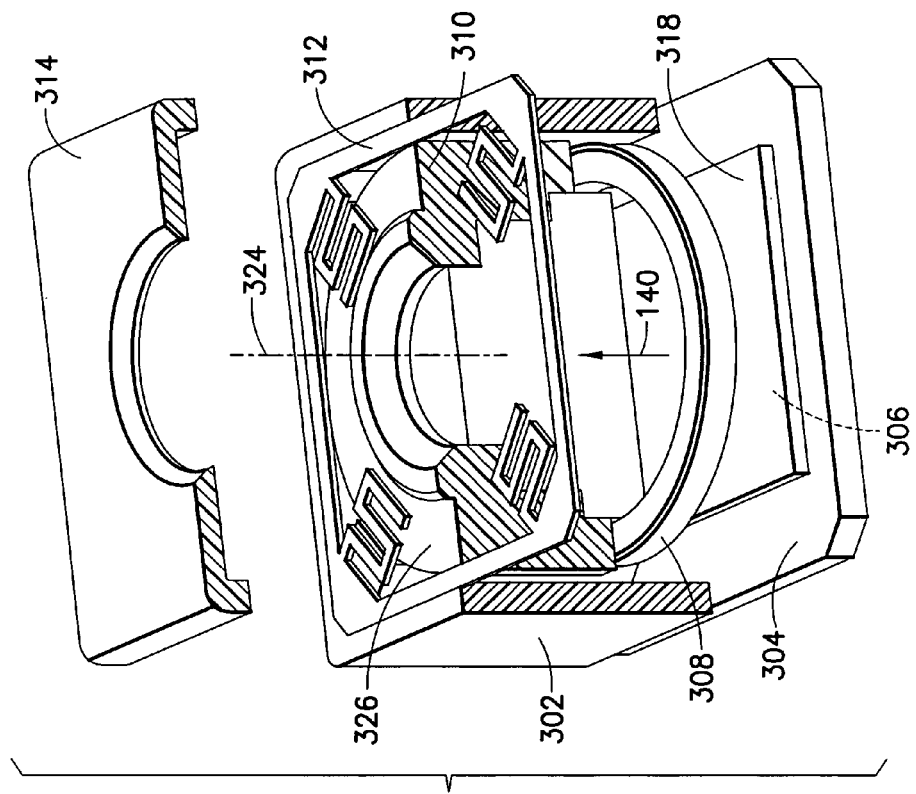
FIG. 17 is a partial cross-section view of the camera module shown in FIG. 16.
Figure 16:
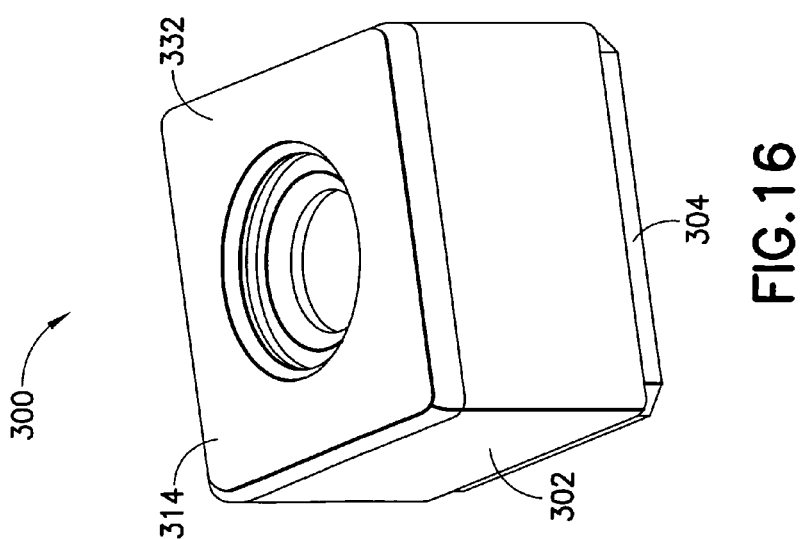
FIG. 16 is a perspective view of another alternative camera module used in the camera shown in FIG. 3.

FIGS. 16 and 17 illustrate a camera module 300 in accordance with a third embodiment of the invention. The camera module 300 provides for autofocus control functions. An actuator system provided for moving the camera optics within the camera module is based on electromagnetism similar to the camera modules 40, 200. Generally, the actuator system comprises a two part electromagnetic actuation system with a coil-magnet structure.

The camera module 300 may be configured to fit inside an SMIA65 footprint size (about 4 mm-6.5 mm×about 4 mm-6.5 mm). However, any suitable footprint size or configuration may be provided.

The camera module comprises a lens housing 302, a printed wiring board 304, a coil 306, a magnet 308, a lens holder 310, a spring 312, and a top cap 314.

The printed wiring board 304 forms a bottom side (or end) 316 of the camera module 300 and comprises an image sensor 318 and the electromagnetic coil 306. The coil 306 can be a separate coil 306A wound from a copper wire and located inside the module 300 around the image sensor 318 (shown in FIGS. 18 and 19) or the coil 306 can be an embedded coil 306B in the printed wiring board 304 (shown in FIGS. 20 and 21).

Figure 19:
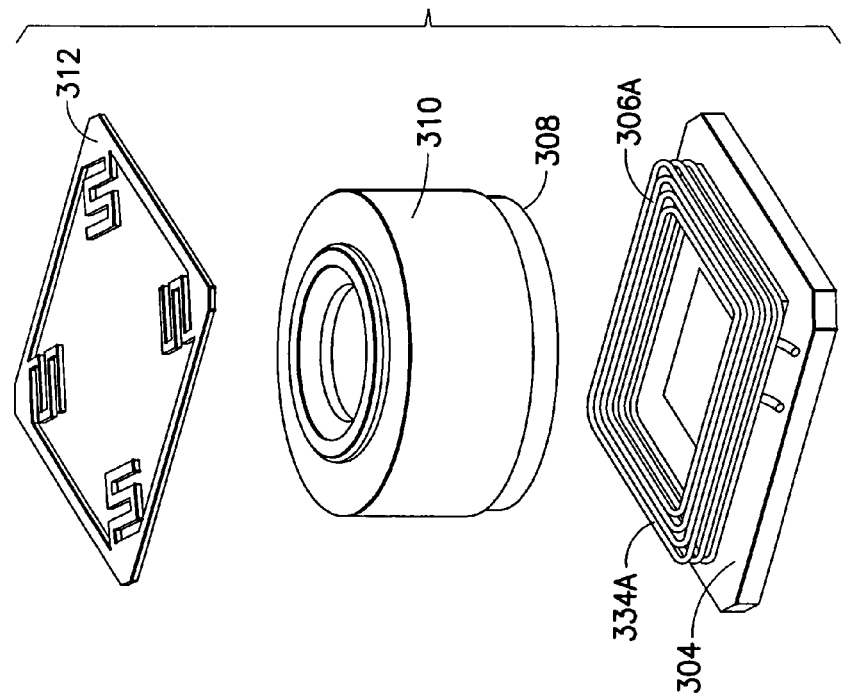
FIG. 19 is an exploded perspective view of the actuation system shown in FIG. 18.
Figure 18:
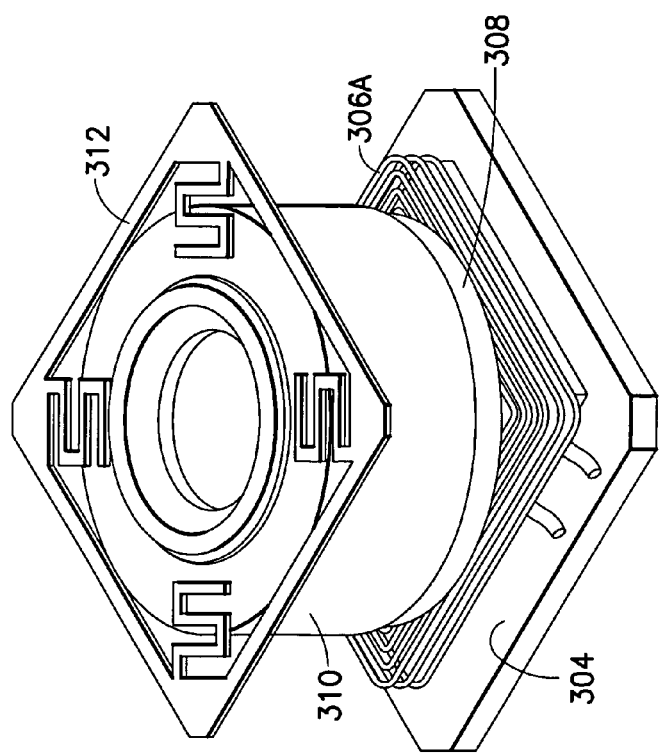
FIG. 18 is a perspective view of an actuation system used in the camera module shown in FIG. 16.

In the embodiment shown in FIGS. 18 and 19, the coil 306A comprises a simple doughnut/ring shape with a substantially flattened thickness. However, in alternate embodiments, the coil can be wound into any suitable shape, thickness, or configuration.

Figure 21:
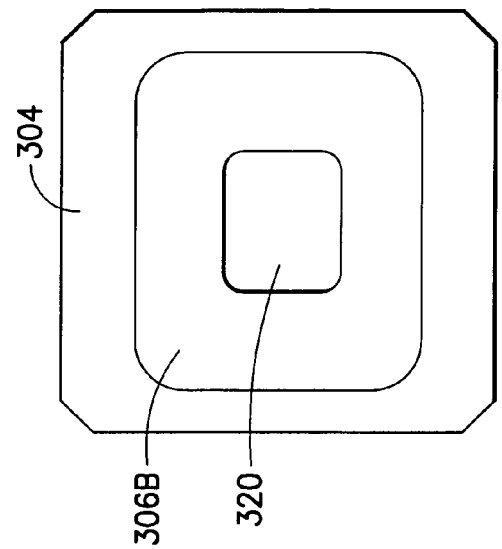
FIG. 21 is a top view of a printed circuit board used in the camera module shown in FIG. 16.
Figure 20:
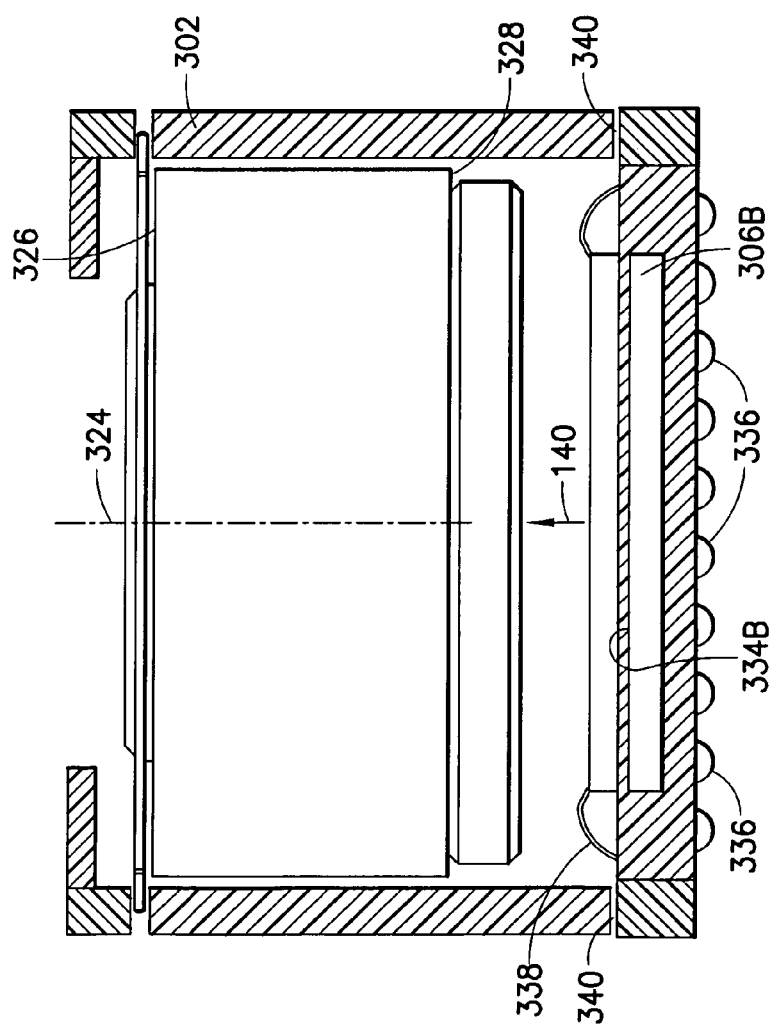
FIG. 20 is a side view of the camera module shown in FIG. 16.

In the embodiment shown in FIGS. 20 and 21, the embedded coil 306B is embedded in the printed wiring board 304 with known technologies/methods, which may include mass-produced printed wiring boards (such as, fabricated by Asahi-Kasei Company (Japan)) known in electronics industries for various applications (e.g. optical image stabilizers). The embedded coil 306B can be easily provided inside camera modules as camera modules generally include a base substrate (e.g. PWB) which works as a sensor mount. The embedded coil 306B may be a fine pitch pattern coil which can be manufactured directly to the printed wiring board 304 which holds the image sensor 318. The coil 306B can be located under the sensor 318 and may be electrically connected to the printed wiring board 304 internally without external wirings. The thickness of the embedded coil 306B may slightly increase the thickness of the printed wiring board 304 by about 0.4 mm or less for example. Electromagnetic forces which move the upper magnet 308 may be applied through the sensor 318. The coil 306B can also have a free area 320 in a middle portion to fit embedded passives as shown in FIG. 21. The camera module 300 configuration allows for autofocus control functions to be applied to very small camera modules. Additionally, since the lens holder 310 only includes the lens 322 and the magnet 308, no electrical wiring is needed to the dynamically moving element.

The moving lens holder 310 comprises a general barrel type shape and is disposed within the camera module 300 above the sensor 318 and opposite the printed wiring board 304. The lens holder 310 houses the lens 322 comprising a central axis 324. A top side 326 and a bottom side 328 of the lens holder 310 are substantially perpendicular to the central axis 324. The ring shaped magnet member 308, which may be a permanent magnet for example, is attached to the bottom side 328 of the lens holder 310 with either of the poles (N/S) facing down towards the coil 306B. The magnet 308 may be mounted with adhesive to the barrel unit 310. However, any suitable means for connecting the magnet to the lens holder may be provided. The magnet 308 and the coil 306B form an electromagnetic actuator system 330. The main housing 302 around the lens holder 310 may include guiding surfaces to enable sliding of the lens holder 310 along Z direction 140. The lens barrel (or lens holder) 310 is connected to the main housing 302 with the bias spring 312 which pushes the lens barrel 310 to one limit position when the actuator or actuation system 330 is non-powered. The top cap 314 covers the spring 312 and forms a top end 332 of the camera module 300. The limit position is typically an infinity mode (sharp images can be taken on longer distances). When for example, autofocus is needed or for close-ups (macro), the coil 306A, 306BB is activated and the magnet 308 is pushed outwards from the sensor 318 (and the lens barrel against bias spring). This movement of the lens holder 310 is provided by the interaction of magnetic fields between the magnet 308 and the coil 306A, 306B wherein the magnet 308 moves in a direction substantially normal to a surface 334A, 334B of the coil 306A, 306B (and along the Z direction 140). The amount of current adjusts the position of lens barrel 310 (spaced from the coil 306A, 306B) between the limit (inf-macro) positions. The magnetic actuation effect applied through the sensor 318 (as the image sensor 318 is neutral to this electromagnetism) to the other side where the magnet 308 is to provide an interaction of magnetic forces similar to the autofocus control function description for the camera module 40, 200 above.

Figure 9:
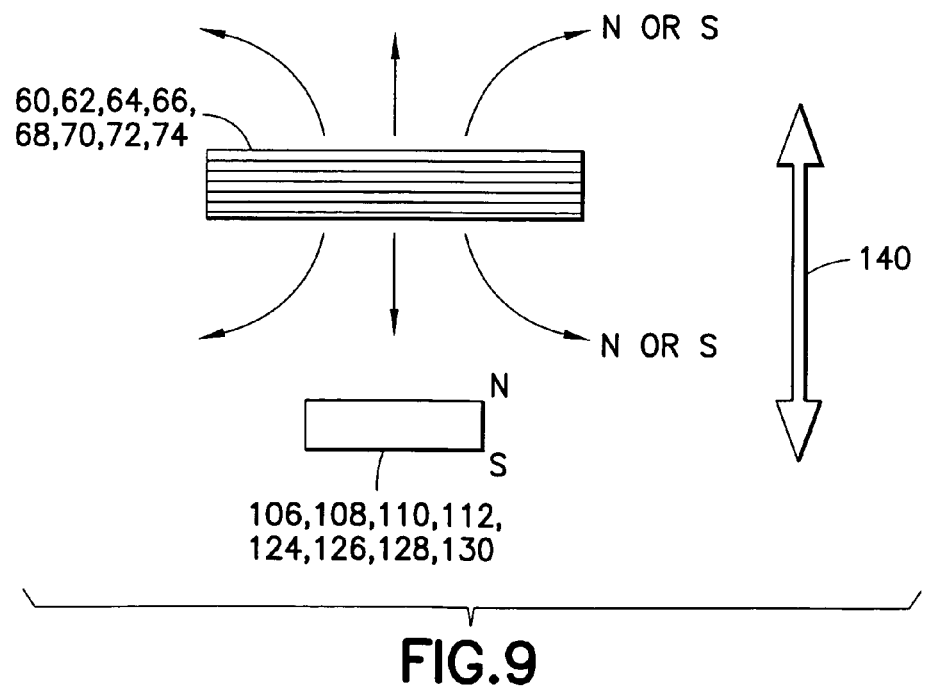
FIG. 9 is a diagram of the coil-magnet configuration of the camera module shown in FIG. 4.

The actuation of the lens holder is provided with an electromagnetic effect similar to the illustration in FIG. 9. Conventional configurations (such as in the Sony Corporation model DSC T9, and the conventional autofocus configuration 300A shown in FIGS. 30 and 31, for example) generally provide two coils which are used to slide a magnet in front of them towards either of the coils by activating suitable (S/N) pole combinations electrically (as shown in FIG. 8). Embodiments of the invention provide a coil and magnet combination in a way that basically floats the magnet over the coil. This new solution also changes the movement direction of the magnet with respect to the coil by ninety degrees.

In this embodiment, a hold force may not be provided to the lens holder when the actuator is de-energized. Power may be needed to keep the lenses positioned at certain situations. However, alternate embodiments may provide any suitable positional configurations.

Following the technology development towards smaller cameras with higher packaging efficiency and miniaturization, the camera module provides for a new way to create an actuator or actuation system that has no moving parts.

Complete reflowability of the system may be achieved by embedding the coil 306B inside the printed wiring board 304 structure. This provides for all the electrical wirings to be made with the printed wiring board manufacturing process. As shown in FIG. 20, the printed wiring board 304 may comprise a ball grid array (BGA) interface 336. Also since the dynamically moving lens unit is a passive element, i.e. there are no internal wirings or solderings which would melt at high (260 deg.) temperature, it will survive the temperatures experienced during the soldering process. Magnets are generally more sensitive to heat (and moisture). However, high temperature magnet grades (with nickel coating) are currently available from various suppliers and may be provided. Additionally, plastic materials (such as from the housing 302 for example), conventional wire bondings 338, and adhesives 340, can have heat resistance. Furthermore, no separate FPC cable is needed to the moving optics unit with meltable solder joints. One example of a conventional reflowable type camera may be found in the Nokia N95 device.

Embodiments of the invention provide processability and product integration advantages by including configurations that can be expanded to reflowable type cameras. Since the wire coil is neutral to high temperatures and the magnet can also have resistance against high temperatures, the actuation system can be put through the SMD process. So far a reflowable autofocus camera has been difficult to make with conventional technologies.

Finding a maximum packaging efficiency (high sensor resolution with good optics) may still be a valid target for desired miniaturization of camera modules. These can be enabled with the proposed actuator solution since the expanded lateral space for the sensor and optics is available. The conventional barrel diameters and module outline sizes (described below) are either difficult or impossible with currently commercially available autofocus technologies (voice coil solutions, conventional electromagnetic actuators, shape memory alloys, etc.) and according to supplier survey there are no better conventional solutions available.

The camera module 300 provides several extension possibilities, such as a small camera with a large barrel size and reflowability. For example, the camera module may be implemented in several configurations such as SMIA65 auto focus (AF) with M5 barrel (6.5 mm), SMIA5 AF with M3.5 barrel (5 mm), SMIA4 AF with M2.5 barrel (4 mm), or a reflowable SMIA65 AF with M5 barrel and BGA interface. However, any suitable configuration may be provided.

Embodiments of the invention allowing for reflowability provides implementation advantages as conventional SMIA-generation cameras will be ramped down eventually. Reflowability enables to directly mount the camera to phone PWB without additional socket, saving space, cost and reduce the number of parts.

Conventional configurations generally provide actuator solutions having electromagnetic based systems with different variations which are used in larger cameras. However, these configurations provide size constraints in supporting the migration towards smaller cameras. One problem is that their form factor is consuming the space in lateral directions inside the camera. Lateral space may be needed in order to maximize the lens barrel size and for wide optics applications. Thus the actuator forces the size of optics to be smaller and reduces their performance. Also the complexity of traditional systems is high. Embodiments of the invention provides for using a new actuator configuration that can fit into a vertical space, enable wide optics, and allow for better packaging efficiency. Simplicity is also provided with embodiments of the invention since the total actuation system has only 2 parts (i.e. coil and magnet).

The development of conventional autofocus camera configurations (such as the conventional autofocus configuration 300A shown in FIGS. 30 and 31, for example) has been primarily directed towards larger size cameras, such as those cameras having sizes of length (L)>10 mm×width (W)>10 mm×height (H)<10 mm. As electronic devices become smaller and smaller, the trend now is to go below 10 mm in L, W, and H dimensions. However, when the footprint size becomes close to about 6 mm×6 mm and even smaller, there are no commercially available conventional solutions for these smaller size constraints.

Embodiments of the invention provide for an improved configuration having the desired imaging functions as well as a compact package size, low number of parts, simple assembly structure, and reflowability.

FIGS. 22 and 23 illustrate a camera module 400 in accordance with a fourth embodiment of the invention. This embodiment provides for the implementation of an optical image stabilizer that has a floating correction lens which is operated by electromagnetic actuators. By moving the lens into opposite directions as the unwanted vibration from hand shaking for example, the image is kept stable on the camera sensor. This presents a radical miniaturization of conventional optical image stabilization designs which generally utilizing linear guides and different types of magnetic actuators.

The camera module 400 comprises a lens holder 402, a main housing 404, an FPC cable 406, and a top cap 408. Embodiments of the invention may also include a stabilizer element, gyro sensors, and control circuitry inside mobile phone.

The lens holder 402 comprises a lens 410 and a plurality of magnet members 412, which may be permanent magnets for example. In this embodiment, the lens holder 402 comprises a general flat planar shape with the lens 410 centered within the lens holder 402. However, in alternate embodiments the lens holder 402 may comprise any suitable shape. The lens 410 comprises a central axis 414 extending substantially perpendicular to a top side 416 and a bottom side 418 of the lens holder 402. The plurality of magnets 412 are disposed along lateral side portions of the lens holder 402. The magnets 412 may be disposed such that the same poles (N/S) are pointing to same the directions.

The main housing 404 comprises a receiving area 420, side walls 422, and a lens opening 424. The receiving area 420 is suitably sized and shaped to receive the FPC cable 406 and the lens holder 402 (best shown in FIG. 24). The main housing 404 also comprises an open section 426 which allows a portion of the cable 406 to extend therethrough. The lens opening 424 is configured to be opposite the lens 410 and is sized and shaped to maintain alignment with the lens 410 upon movement of the lens holder 402 within the camera module 400.

Figure 25:
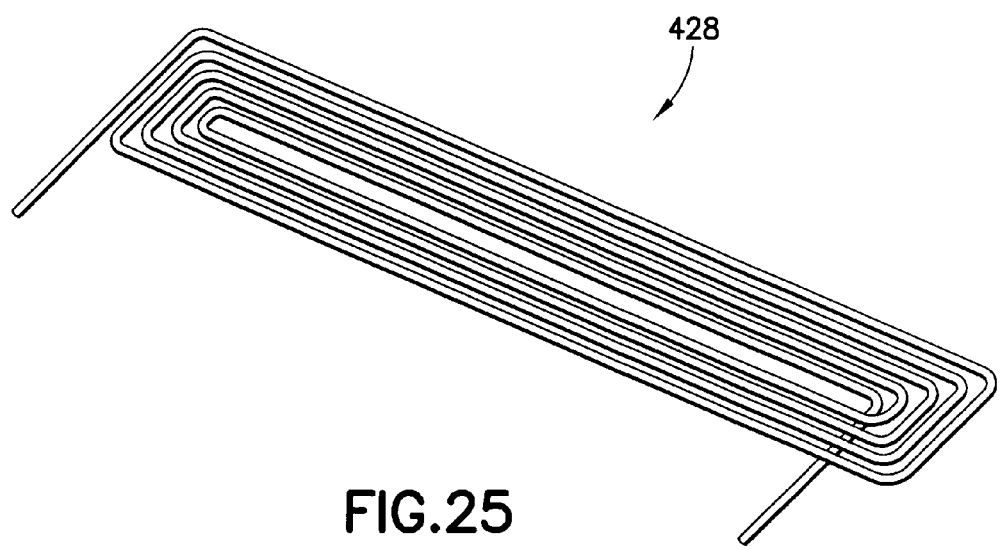
FIG. 25 is a perspective view of an electromagnetic coil used in the camera module shown in FIG. 22.

The FPC cable 406 comprises a plurality of magnet members 428 and positioning sensors 430. The magnet members 428, may be electromagnetic coils for example. The coils 428 may be wound to a general flattened doughnut shape (best shown in FIG. 25) and are connected to the flat FPC cable 406. The coils 428 are located along outer portions of the FPC cable 406 and are configured to be proximate the side walls 422 of the housing 404 when the FPC cable 406 is installed inside the housing 404 on an inner bottom surface of the main housing 404. A portion of the FPC 406 is extended out of the camera module 400 at the open section 426 for external connections such as a control circuit or a power supply for example. The positioning sensors 430, which may be magnetic, Hall-type sensors for example, are mounted to the FPC 406 and can detect the distance of the opposite moving magnet and locate the lens accurately. In one embodiment, one of the sensors 430 may be configured to detect distances in the X direction 136, and the other of the sensors 430 may be configured to detect distances in the Y direction 138. However, any suitable sensor configuration may be provided.

Figure 24:
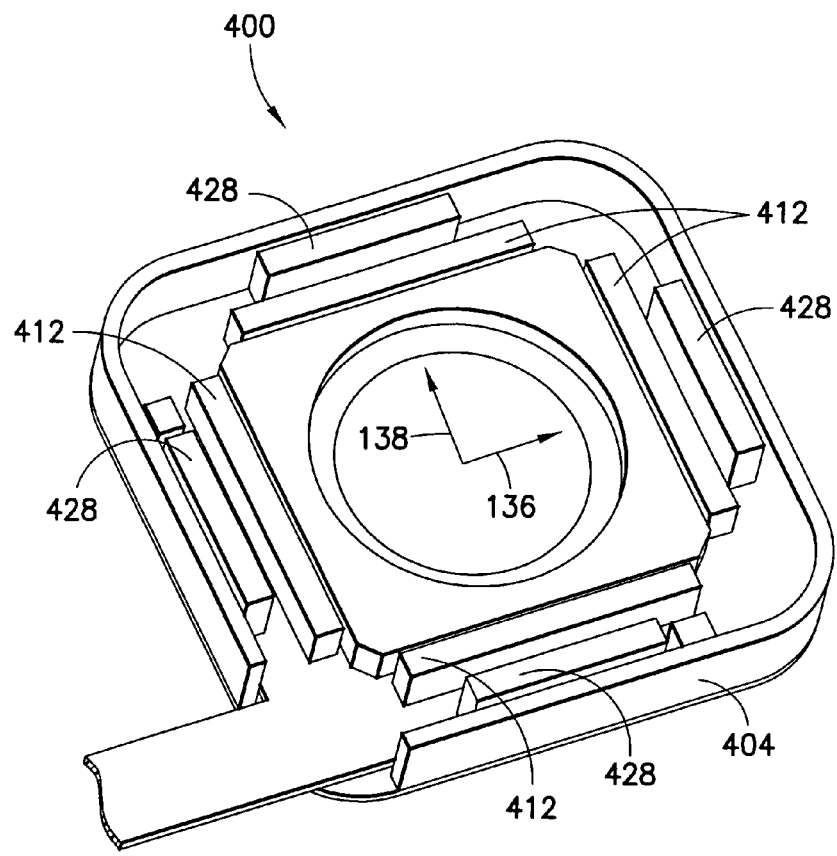
FIG. 24 is a perspective view of the camera module shown in FIG. 22 with a top cap removed.

The lens holder 406 is installed inside the receiving area 420 between the coils 428 (as shown in FIG. 24). The open area between the coils 428 allows for the lens holder 402 to move freely in the X direction 136 and in the Y direction 138.

The cap 408 is attached to the top of the main housing 404. The cap is configured to be snap fitted to the housing 404. However, any suitable fastening configuration may be provided. The cap forms a top side or end 432 of the camera module and also seals the assembly.

By generating (and adjusting) the electric fields with the four coils 428 which attract the opposite magnets 412, the lens unit 402 can be moved inside the main housing 404. The coils and the magnets form an actuation system 436. This movement of the lens holder 402 is provided by the interaction of magnetic fields between the magnets 412 and the coils 428 wherein the magnets 412 move in a direction substantially normal to surfaces 434 of the coils 428. Image correction (such as a lens shift for example) may then be calculated in the control circuitry with the feedback received from external gyro sensors.

The actuation of the lens unit 402 is provided with an electromagnetic effect similar to the illustration in FIG. 9. Conventional configurations (such as in the Sony Corporation model DSC T9, and the conventional autofocus configuration 300A shown in FIGS. 30 and 31, for example) generally provide two coils which are used to slide a magnet in front of them towards either of the coils by activating suitable (S/N) pole combinations electrically (as shown in FIG. 8). Embodiments of the invention provide a coil and magnet combination in a way that basically floats the magnet in front of the coil. This new solution also changes the movement direction of the magnet with respect to the coil by ninety degrees. By having four of these coil-magnet units on each side of the lens, the lens can be moved to any directions e.g. with attracting effect (N poles are generated to the coils while the magnets have S poles).

Figure 32:
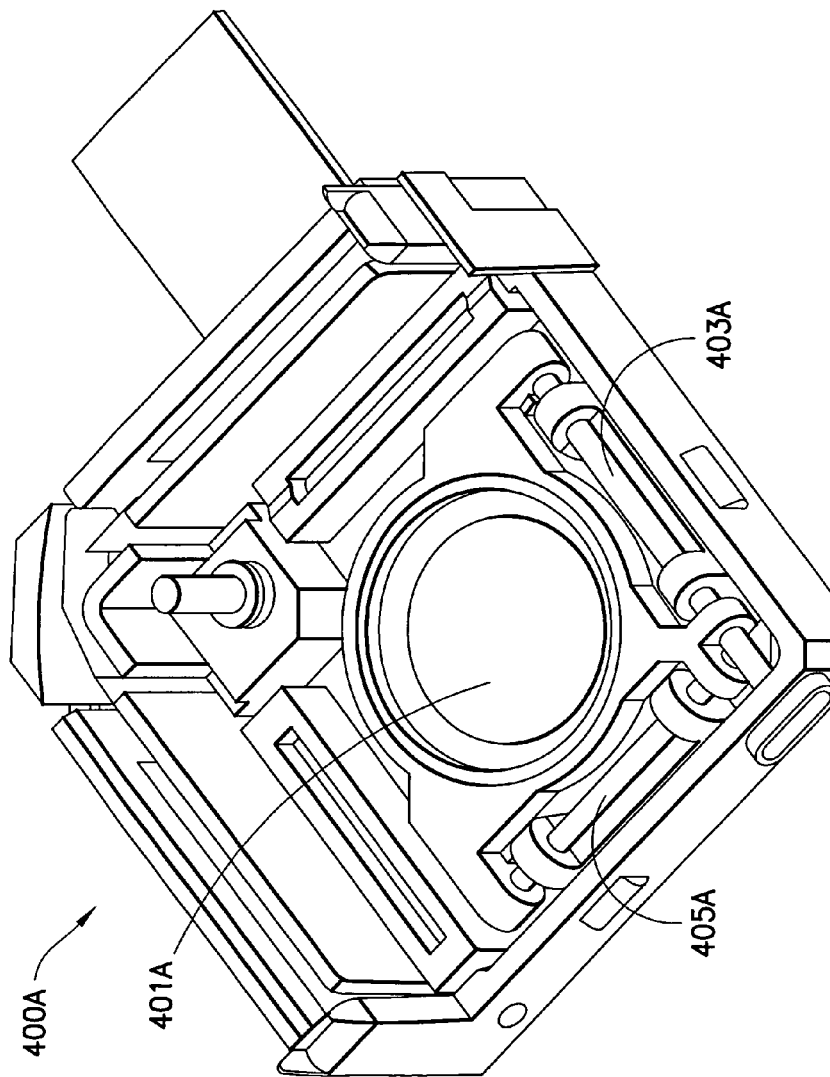
FIG. 32 is perspective view of a conventional image stabilization configuration.

Embodiments of the invention provide for advantages over conventional configurations by targeting total miniaturization and cropping extra elements. For example, conventional configurations (having a size of about 20 mm×20 mm×9 mm as in the conventional image stabilization configuration 400A shown in FIG. 32, for example) include electromagnetic actuators for moving the lens along direction guides. Embodiments of the invention provide a lens which is "floated" with high performance electromagnetic actuators. Embodiments of the invention do not require linear guides, and therefore only the actuator and the lens have remained which allows for a small camera module size which may be about 10-12 mm×10-12 mm×2 mm for example. As the camera module may provide a maximum total thickness of about 2 mm, it is easily integratable to a small camera module as an add-on-feature (i.e. mounted on top of the module). Additionally, the use of electromagnetic field actuators within the camera module provide for a fast response for the lens movement when compared to conventional configurations.

Figure 26:
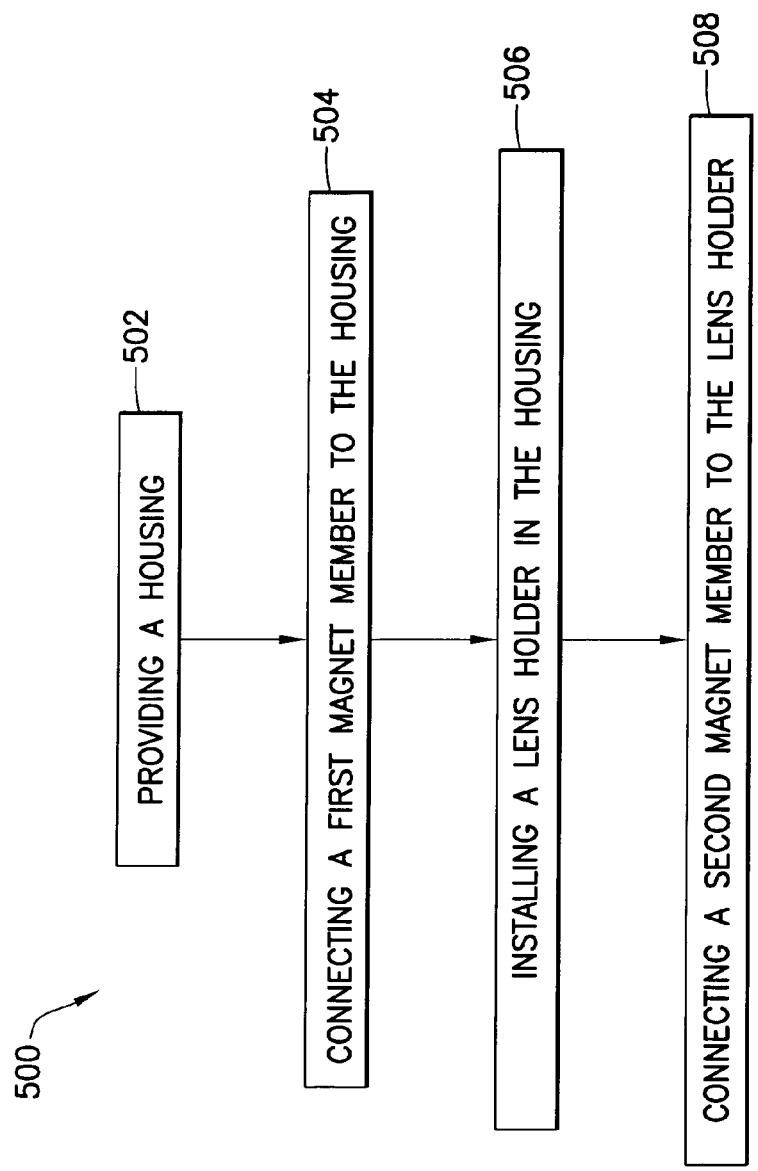
FIG. 26 is a block diagram of an exemplary method of manufacturing the camera module shown in FIG. 4.

FIG. 26 illustrates a method 500 of manufacturing a camera module. The method includes the following steps. Providing a housing (502). Connecting a first magnet member to the housing, wherein the first magnet member comprises a first surface (504). Installing a lens holder in the housing, wherein the lens holder comprises a lens (506). Connecting a second magnet member to the lens holder, wherein the second magnet member comprises a second surface, wherein the second surface is opposite the first surface of the first magnet member, and wherein the second magnet member is configured to move in a direction substantially normal to the first surface of the first magnet member when a magnetic force is generated between the first magnet member and the second magnet member (508). It should be noted that any of the above steps may be performed alone or in combination with one or more of the steps.

Figure 27:
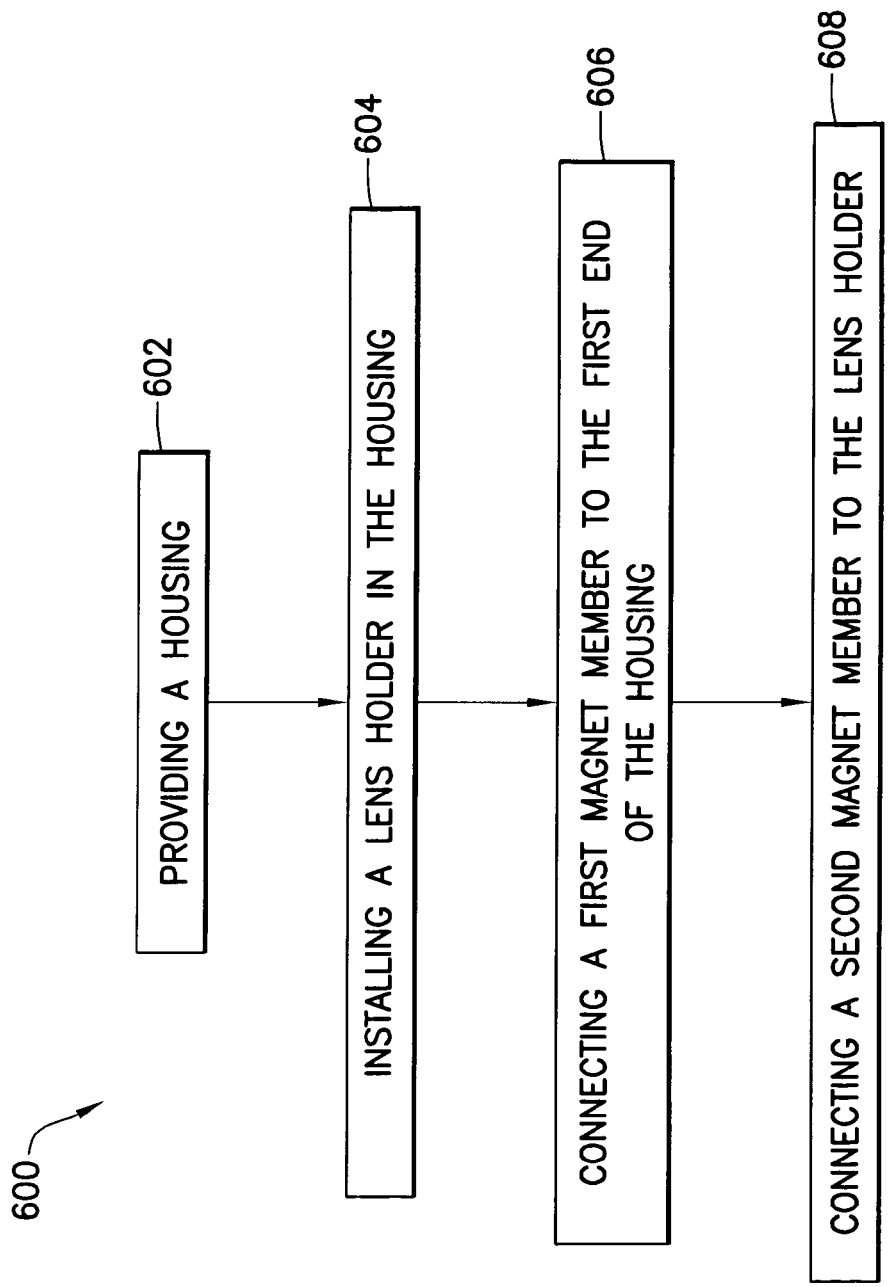
FIG. 27 a block diagram of another exemplary method of manufacturing the camera module shown in FIG. 4.

FIG. 27 illustrates another method 600 of manufacturing a camera module. The method includes the following steps. Providing a housing comprising a first end and an opposite second end (602). Installing a lens holder in the housing, wherein the lens holder comprises a first side, an opposite second side, and a lens, wherein the lens comprises a central axis, wherein the first side and the second side are substantially perpendicular to the central axis, wherein the first side of the lens holder is proximate the first end of the housing, wherein the second side of the lens holder is proximate the second end of the housing, and wherein the lens holder is configured to be movable between the first end and the second end of the housing along the central axis (604). Connecting a first magnet member to the first end of the housing (606). Connecting a second magnet member to the lens holder, wherein the second magnet member is proximate the first side of the lens holder, wherein the second magnet member is opposite the first magnet member, and wherein the second magnet member is configured to be spaced from the first magnet member in a direction along the central axis (608). It should be noted that any of the above steps may be performed alone or in combination with one or more of the steps.

Figure 28:
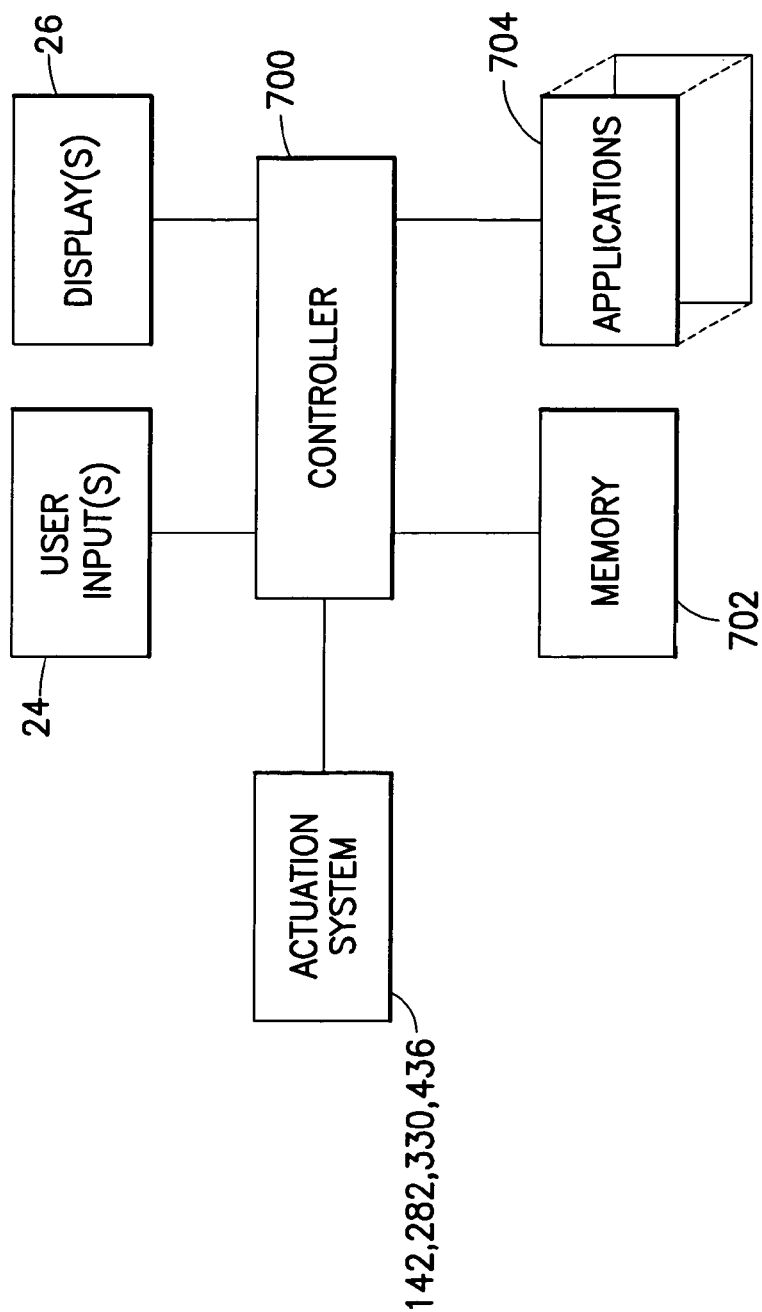
FIG. 28 is a schematic diagram illustrating components of the electronic device shown in FIG. 1.

Referring now also to FIG. 28, the device 10 generally comprises a controller 700 such as a microprocessor for example. The electronic circuitry includes a memory 702 coupled to the controller 700, such as on a printed circuit board for example. The memory could include multiple memories including removable memory modules for example. The device has applications 704, such as software, which the user can use. The applications can include, for example, a telephone application, an Internet browsing application, a game playing application, a digital camera application, etc. These are only some examples and should not be considered as limiting. One or more user inputs 24 are coupled to the controller and one or more displays 26 are coupled to the controller. The actuation system 142, 282, 330, 436 is also coupled to the controller 700. The device 10 may programmed to automatically change a position of the lens within the camera module. However, in an alternate embodiment, this might not be automatic. The user might need to actively select a change of the lens position.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus comprising:
a housing;
a first magnet member connected to the housing, wherein the first magnet member comprises a first surface;
a lens holder in the housing, the lens holder having a general flat planar shape with a top side, a bottom side, and lateral side portions, wherein the lens holder comprises a lens, wherein the lens is between the top side and the bottom side, and wherein the lens holder is movable in the housing without a guide arrangement therebetween;
a second magnet member connected to one of the lateral side portions of the lens holder, wherein the second magnet member is between the lens and the first magnet member, wherein the second magnet member comprises a second surface, wherein the second surface is opposite the first surface of the first magnet member, and wherein the second magnet member is configured to move in a direction substantially normal to the first surface of the first magnet member when a magnetic force is generated between the first magnet member and the second magnet member; and
a third magnet member connected to the housing, wherein the second magnet member is between the first magnet member and the third magnet member, and wherein the magnet members are proximate the top side of the lens holder.

2. The apparatus of claim 1 wherein the first magnet member is an electromagnetic coil, and wherein the second magnet member is a permanent magnet, and wherein the permanent magnet extends along a majority of a distance between the top side and the bottom side of the lens holder.

3. The apparatus of claim 1 wherein the lens is configured to provide an optical image stabilization function within a camera in response to the magnetic force.

4. The apparatus of claim 1 wherein the second magnet member is directly between the first magnet member and the third magnet member.

5. An apparatus comprising:
a housing section comprising a camera window;
electronic circuitry mounted within the housing section; and
an apparatus as in claim 1 mounted in the housing section proximate the camera window.

6. An apparatus comprising:
a housing section;
electronic circuitry mounted in the housing section; and
a camera module connected to the electronic circuitry, wherein the camera module comprises a lens holder, a first magnet member, a second magnet member, a third magnet member, and a fourth magnet member, wherein the first magnet member is proximate a first end of the camera module, wherein the second magnet member is connected to the lens holder, wherein the third magnet member is proximate a second end of the camera module, wherein the fourth magnet member is connected to the lens holder opposite the second magnet member, wherein the second magnet member and the fourth magnet member are proximate a top side of the lens holder, wherein the second magnet member is between the first magnet member and the third magnet member, wherein the lens holder is free of a guide arrangement and comprises a lens, wherein the first magnet member, the second magnet member, the third magnet member, and the fourth magnet member are configured to exert a force on the lens holder, and wherein the lens holder is configured to be movable between the first end and the second end of the camera module along a first direction and a second direction, and wherein the second direction is substantially perpendicular to the first direction.

7. The apparatus of claim 6 wherein the second magnet member is directly between the first magnet member and the third magnet member.

8. The apparatus of claim 6 wherein the second magnet member is configured to be spaced from the first magnet member and the third magnet member, and wherein the camera module comprises overall dimensions of about 12 mm by about 12 mm by about 2 mm.

9. A method comprising:

providing a housing;

connecting a first magnet member to the housing, wherein the first magnet member comprises a first surface;

installing a lens holder in the housing, the lens holder having a general flat planar shape with a top side, a bottom side, and lateral side portions, wherein the lens holder is free of a guide arrangement and comprises a lens;

connecting a second magnet member to one of the lateral side portions of the lens holder, wherein the second magnet member is between the lens and the first magnet member, wherein the second magnet member comprises a second surface, wherein the second surface is opposite the first surface of the first magnet member, and wherein the second magnet member is configured to move in a direction substantially normal to the first surface of the first magnet member when a magnetic force is generated between the first magnet member and the second magnet member; and connecting a third magnet member to the housing, wherein the second magnet member is between the first magnet member and the third magnet member, and wherein the magnet members are proximate the top side of the lens holder.

* * * * *